United States Patent
Wiryawan et al.

(10) Patent No.: US 8,160,955 B2
(45) Date of Patent: Apr. 17, 2012

(54) METHOD AND APPARATUS FOR CAPTURING COMMERCIAL LOAN APPLICATION DATA AND ASSIGNING A COMMERCIAL LOAN REQUEST

(75) Inventors: Antonius Adhi Wiryawan, Hayward, CA (US); Kit Man Cheng, Oakland, CA (US); Weide Ju, Cupertino, CA (US); Hichem Sellami, Oakland, CA (US); Durgesh Kotwal, Fremont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 2403 days.

(21) Appl. No.: 10/024,990

(22) Filed: Dec. 19, 2001

(65) Prior Publication Data

US 2007/0226128 A1 Sep. 27, 2007

Related U.S. Application Data

(60) Provisional application No. 60/342,022, filed on Dec. 18, 2001.

(51) Int. Cl.
G06Q 40/00 (2012.01)
G06Q 30/00 (2012.01)
G06Q 50/00 (2012.01)

(52) U.S. Cl. ......... 705/38; 705/26.41; 705/35; 705/313

(58) Field of Classification Search ............... 705/1, 26, 705/27, 35, 38, 50, 80; 701/207; 715/500
See application file for complete search history.

(56) References Cited

U.S. PATENT DOCUMENTS

| | | | | |
|---|---|---|---|---|
| 4,025,905 A | * | 5/1977 | Gorgens | 709/227 |
| 4,233,661 A | * | 11/1980 | Bolton et al. | 705/30 |
| 5,699,527 A | * | 12/1997 | Davidson | 705/38 |
| 5,758,126 A | * | 5/1998 | Daniels et al. | 705/37 |
| 6,014,670 A | | 1/2000 | Zamanian et al. | 101/101 |
| 6,016,482 A | * | 1/2000 | Molinari et al. | 705/35 |
| 6,301,586 B1 | | 10/2001 | Yang et al. | 707/104 |
| 6,345,278 B1 | * | 2/2002 | Hitchcock et al. | 715/234 |
| 6,366,892 B1 | * | 4/2002 | Altman et al. | 705/38 |
| 6,460,042 B1 | | 10/2002 | Hitchcock et al. | 707/10 |
| 6,496,835 B2 | | 12/2002 | Liu et al. | 707/102 |
| 6,529,885 B1 | * | 3/2003 | Johnson | 705/64 |
| 6,684,196 B1 | * | 1/2004 | Mini et al. | 705/37 |
| 6,691,094 B1 | * | 2/2004 | Herschkorn | 705/37 |

(Continued)

OTHER PUBLICATIONS

Michigan National ramps up automation; Jeanne O'Brien; Bank Systems & Technology; Dec. 1999; 36, 12; 1-page.*

(Continued)

*Primary Examiner* — Gregory Johnson
(74) *Attorney, Agent, or Firm* — Campbell Stephenson LLP

(57) ABSTRACT

Methods, apparatus, and articles of manufacture for capturing commercial loan application data and assigning a commercial loan request are disclosed herein. Embodiments of the invention provide mechanisms for capturing commercial loan application data, assigning a commercial loan request, monitoring an approval process, and administering association of accounts with approved requests via a series of user interface displays communicated to a user via a network communication link. In addition, the network environment of the invention provides for the storage of data in a relational database management system that enables previously entered data to populate data fields of applets within the user interface displays without the necessity to re-enter the data. Moreover, the status of the review process may be monitored to more quickly respond to requests for such information by the customer.

24 Claims, 19 Drawing Sheets

U.S. PATENT DOCUMENTS

| | | | |
|---|---|---|---|
| 6,694,338 B1 | 2/2004 | Lindsay | 707/203 |
| 6,711,575 B1 | 3/2004 | Applewhite et al. | 707/100 |
| 6,823,495 B1 | 11/2004 | Vedula et al. | 715/805 |
| 6,859,783 B2* | 2/2005 | Cogger et al. | 709/223 |
| 6,889,260 B1 | 5/2005 | Hughes | 709/246 |
| 6,898,636 B1* | 5/2005 | Adams et al. | 709/229 |
| 6,901,384 B2* | 5/2005 | Lynch et al. | 705/38 |
| 6,904,412 B1* | 6/2005 | Broadbent et al. | 705/38 |
| 6,934,905 B1* | 8/2005 | Tighe | 715/209 |
| 6,985,886 B1* | 1/2006 | Broadbent et al. | 705/38 |
| 6,993,505 B1* | 1/2006 | Katz et al. | 705/38 |
| 7,010,503 B1* | 3/2006 | Oliver et al. | 705/26 |
| 7,035,820 B2* | 4/2006 | Goodwin et al. | 705/37 |
| 7,162,635 B2* | 1/2007 | Bisbee et al. | 713/176 |
| 7,257,581 B1* | 8/2007 | Steele et al. | 705/1 |
| 7,284,005 B1 | 10/2007 | Wiryawan et al. | 707/101 |
| 7,287,008 B1* | 10/2007 | Mahoney et al. | 705/38 |
| 2001/0054022 A1* | 12/2001 | Louie et al. | 705/38 |
| 2002/0059137 A1* | 5/2002 | Freeman et al. | 705/38 |
| 2002/0062277 A1 | 5/2002 | Foster et al. | 705/38 |
| 2002/0091732 A1 | 7/2002 | Pedro | 707/505 |
| 2002/0174061 A1* | 11/2002 | Srinivasan et al. | 705/38 |
| 2003/0004965 A1 | 1/2003 | Farmer et al. | 707/104.1 |
| 2003/0112306 A1 | 6/2003 | Simpson et al. | 347/101 |
| 2007/0174191 A1* | 7/2007 | Keaton et al. | 705/40 |
| 2007/0355906 | 10/2007 | Wirayawan et al. | 705/35 |

OTHER PUBLICATIONS

Chase integrates commercial loans, syndications into single system; Jennifer L Baljko; Bank Systems & Technology; Oct. 1997; 34, 10; 1-page.*

Software: A Multicurrency Loan Accounting and Syndication System; Luciano, Richard R.Commercial Lending Review; Summer 1990; 5, 3; 4-pages.*

Antonius Adhi Wiryawan et al., "Methods and Apparatus for Capturing Consumer Loan Application Data," U.S. Appl. No. 10/025,523, filed on Dec. 18, 2001.

Antonius Adhi Wiryawan et al., "Data Transfer Method and System," U.S. Appl. No. 10/025,126, filed on Dec. 18, 2001.

Britt, Phil, "NationsBank Pilots On-Line Auto Loan Application System," America's Community Banker, v5n6; Jun. 1996; page 9.

Wiryawan, Antonius Adhi et al., U.S. Patent Application entitled "Methods and Apparatus for Capturing Consumer Loan Application Data"; Filing Date Dec. 18, 2001; U.S. Appl. No. 10/025,523; Request for Continued Examination (RCE), Amendment and Remarks Accompanying Request for Examination, and Petition for Extension of Time as filed on Oct. 29, 2009;15 pages.

Wiryawan, Antonius Adhi et al., U.S. Patent Application entitled "Methods and Apparatus for Capturing Consumer Loan Application Data"; Filing Date Dec. 18, 2001; U.S. Appl. No. 10/025,523; Notice of Allowance and Fee(s) Due dated Dec. 31, 2009; 8 pages.

* cited by examiner

METHOD AND APPARATUS FOR CAPTURING COMMERCIAL LOAN APPLICATION DATA AND ASSIGNING A COMMERCIAL LOAN REQUEST

CROSS-REFERENCE TO RELATED APPLICATION

This application claims benefit under 35 U.S.C. §119 (e) of U.S. provisional application Ser. No. 60/342,022, filed Dec. 18, 2001, entitled "METHOD AND APPARATUS FOR CAPTURING COMMERCIAL LOAN APPLICATION DATA AND ASSIGNING A COMMERCIAL LOAN REQUEST," and naming Antonius Adhi Wiryawan and Kit Man Cheng as inventors.

TECHNICAL FIELD OF THE INVENTION

This disclosure relates generally to financial services, and more particularly, but not exclusively, to methods, apparatus, and articles of manufacture for capturing commercial loan application data and assigning a commercial loan request via an electronic user interface provided via a network communication link.

BACKGROUND INFORMATION

Many financial and/or lending institutions utilize multiple systems to collect customer information for commercial loan applications. In the most basic scenario, printed-paper forms, with spaces provided for the entry of typed or hand-written customer information, are used to collect any requisite information to facilitate processing of the commercial loan application and consideration for approval by a review committee, or the like.

In many cases, a customer seeking a commercial loan may have an existing relationship with the financial and/or lending institution from which the commercial loan is sought. As such, the customer/applicant may have previously provided the financial institution with information specific to the customer/applicant, such as company profile data, or the like, that may be stored by the financial institution in a database.

Currently, no adequate mechanism exists for populating data fields of electronic loan applications with previously provided and stored data. Because at least a portion of the previously provided information (e.g., company profile data) may be required as a part of the commercial loan application process, a loan officer or other representative of the financial institution may be required to repeatedly enter information, previously provided, thereby decreasing productivity and introducing additional potential for errors.

Moreover, current methods of assigning a commercial loan request for review, and of monitoring the status of the approval process, are inadequate. In many cases, paper-based forms may be communicated to a review committee located in a geographic area remote from the application site, creating delay in the approval process, and hindering attempts to monitor the status of the review. For example, if the customer contacts the loan officer to check the status of the commercial loan request, the loan officer may in turn have to contact the review committee and wait for a reply.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

Figure 4:
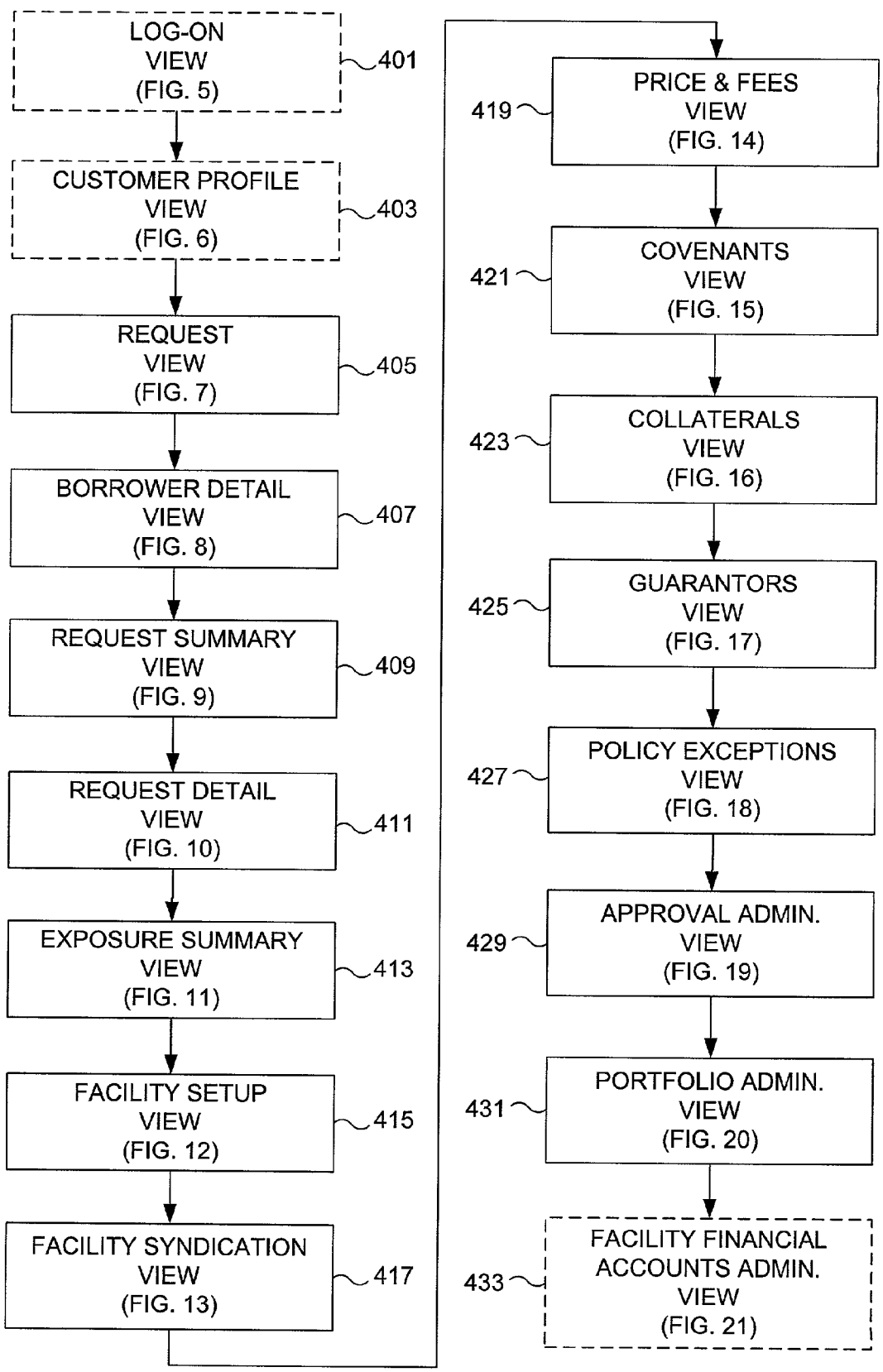

FIG. 4 is a flow diagram illustrating an embodiment of a sequence of user interface ("UI") displays for capturing commercial loan application data, and assigning and administering a commercial loan request in accordance with the teachings of the present invention; and FIGS. 5-21 are illustrations of example UI displays for capturing commercial loan application data, and assigning and administering a commercial loan request in accordance with the teachings of the present invention.

DETAILED DESCRIPTION OF THE ILLUSTRATED EMBODIMENTS

Embodiments of methods, apparatus, and articles of manufacture for capturing commercial loan application data and assigning a commercial loan request are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide methods, apparatus, and articles of manufacture for capturing commercial loan application data, assigning a commercial loan request, monitoring an approval process, and administering association of accounts with approved requests. For example, aspects of the present invention may be embodied in a software application capable of providing a user (e.g., via a client system) with a sequence of UI displays configured to capture requisite information for the completion of a commercial loan application (also "commercial loan request"). Previously provided and stored information (e.g., customer profile information/data, or the like) may be pre-populated into data fields of the UI displays, in an embodiment, to relieve the user of having to repetitively enter the same data.

In addition, the sequence of UI displays may also be configured to enable the user to assign an approval level for the commercial loan request, to assign each stage of the approval process to a specified reviewer, and to associate an approved request with a financial account. In one embodiment, the user may monitor the status of each assigned stage of the review process to enable the user to readily assess the status of the commercial loan request on behalf of the customer/applicant, for example. Other features of the illustrated embodiments will be apparent to the reader from the foregoing and the appended claims, and as the detailed description and discussion is read in conjunction with the accompanying drawings.

Figure 1:
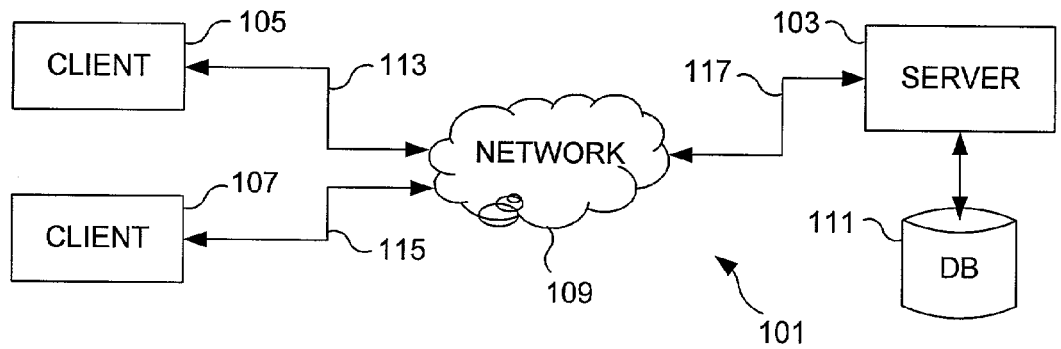
FIG. 1 is a block diagram illustration of a network environment in accordance with the teachings of the present invention.

With reference now to the drawings, and in particular to FIG. 1, an embodiment of a network environment 101 is illustrated in accordance with the teachings of the present invention. In one embodiment, a server 103 may be communicatively coupled to a plurality of client systems 105 and 107 via a network 109. The client systems 105 and 107 may be capable of connecting to the network 109 via individual communication links 113 and 115, respectively, while the server 103 may be capable of connecting to the network 109 via a communication link 117, in an embodiment. It will be appreciated that the number of communicatively coupled client systems may vary in other embodiments in accordance with the teachings of the present invention.

In one embodiment, the communication links 113, 115, and 117 may be used by the client systems 105 and 107, and the server 103, respectively, to send and/or receive content and/or data from one another, such as for example, but not limited to, instructions to cause generation of a UI display, commercial loan application data, or other data or information. The communication links 113, 115, and 117 may comprise physical connections, such as for example, cables, wires, optical fibers, or the like, in an embodiment. In another embodiment, the communication links 113, 115, and 117 may comprise wireless links, such as for example, radio frequency ("RF") links, satellite transmissions, optical signals, or the like, transmitted through the atmosphere, or any combination of the foregoing. The network 109 may, in various embodiments, be any type of communications network through which a plurality of different devices may communicate, such as for example, but not limited to, the Internet, a wide area network ("WAN"), a local area network ("LAN"), an intranet, or the like, or any combination of networks interconnected with one another.

The server 103 may be coupled to a central storage, such as a database 111, in an embodiment, to store data such as commercial loan application data, or the like. In one embodiment, the database 111 may also store content, such as hypertext markup language ("HTML") documents, or the like, capable of being communicated to the client systems 105 and 107 via the server 103 in response to a request communicated by one or more of the client systems 105 and 107. It will be appreciated that communication between the server 103 and the client systems 105 and 107 may be facilitated by any one, or a combination of, known protocols, such as for example, but not limited to, hypertext transfer protocol ("HTTP"), transmission control protocol/Internet protocol ("TCP/IP"), or the like. In one embodiment, the database 111 may comprise a relational database configured to store the consumer loan application data in a manner to make data corresponding to a particular customer accessible to a user via reference to a customer name or other unique identifier.

Figure 2:
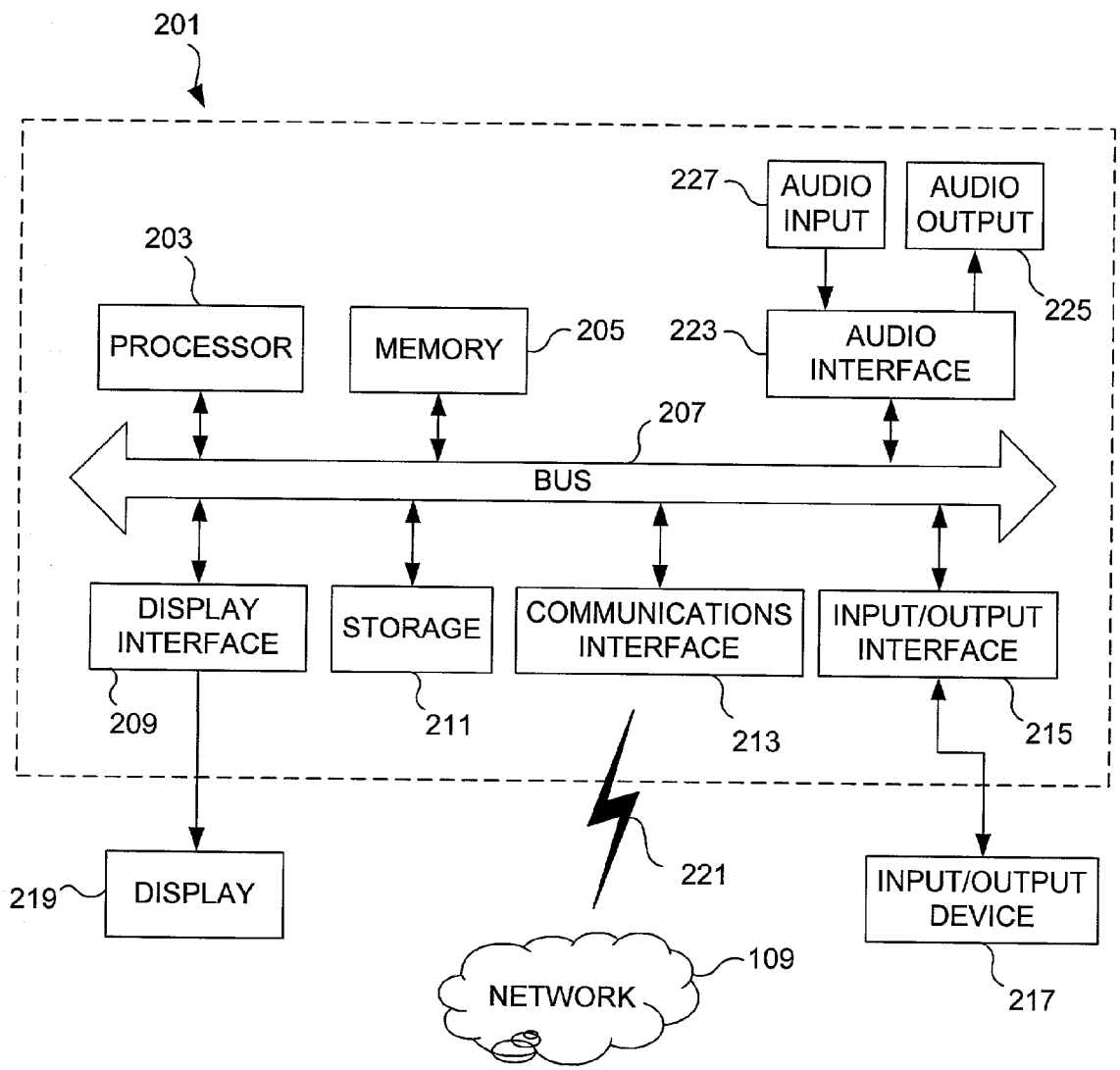
FIG. 2 is a block diagram illustration of an embodiment of a computer system representative of a server or a client system in accordance with the teachings of the present invention.

With reference now primarily to FIG. 2, a block diagram illustrating one embodiment of a machine 201, representative of the server 103 and/or the client systems 105 and 107, is shown in accordance with the teachings of the present invention. Typically, the server 103 may comprise a computer server or similar type of server hardware that is designed to communicate with a plurality of other machines. The clients 105 and 107 may comprise various types of machines, including a desktop computer or a workstation, for example, in an embodiment. In one embodiment, the machine 201 is a computer that includes a processor 203 coupled to a bus 207. A memory 205, a storage 211, a display interface 209, a communications interface 213, an input/output interface 215, and an audio interface 223 are also coupled to the bus 207, in the illustrated embodiment.

In one embodiment, the machine 201 interfaces to external systems through the communications interface 213. The communications interface 213 may include a radio transceiver compatible with various modulated signals, wireless telephone signals, or the like. The communications interface 213 may also include an Ethernet adapter, an analog modem, Integrated Services Digital Network ("ISDN") modem, cable modem, Digital Subscriber Line ("DSL") modem, a T-1 line interface, a T-3 line interface, an optical carrier interface (e.g., OC-3), token ring interface, satellite transmission interface, a wireless interface, or other interfaces for coupling a device to other devices.

In one embodiment, a carrier wave signal 221 is received/transmitted between the communications interface 213 and the network 109. The communications signal 221 may be used to interface the machine 201 with another computer system, a network hub, a router, or the like, in various embodiments. In one embodiment, the carrier wave signal 221 is considered to be machine-readable media, which may be transmitted through wires, cables, optical fibers, or through the atmosphere, or the like.

The processor 203 may be a suitable commercially available processor. The memory 205 may be a machine-readable medium such as dynamic random access memory ("DRAM"), and may include static random access memory ("SRAM"). The display interface 209 controls a display 219, which in one embodiment may be a cathode ray tube ("CRT"), a liquid crystal display ("LCD"), an active matrix display, or the like. An input/output device 217, coupled to the input/output interface 215 may be a keyboard, a disk drive, a printer, a scanner, or other input/output device, including a mouse, a trackball, a trackpad, a joystick, or the like. In one embodiment, the audio interface 223 controls an audio output 225, which may include for example, audio speakers, headphones, an audio receiver, an amplifier, or the like. The audio interface 223 also controls an audio input 227, which may include for example, a microphone, or input(s) from an audio or musical device, or the like, in an embodiment.

The storage 211, in one embodiment, may include machine-readable media such as for example, but not limited to, a magnetic hard disk, a floppy disk, an optical disk, a read-only memory component ("ROM"), a smart card, or another form of storage for data. In one embodiment, the storage 211 may include removable media, read-only memory, readable/writable memory, or the like. Some of the data may be written by a direct memory access process into the memory 205 during execution of software in the computer system 201. It will be appreciated that software may reside in the storage 211, the memory 205, or may be transmitted or received via a modem or a communications interface 213. For the purpose of the specification, the term "machine-readable medium" shall be taken to include any medium that is capable of storing data, information, or encoding a sequence of instructions or operations for execution by the processor 203 to cause the processor 203 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

Figure 3:
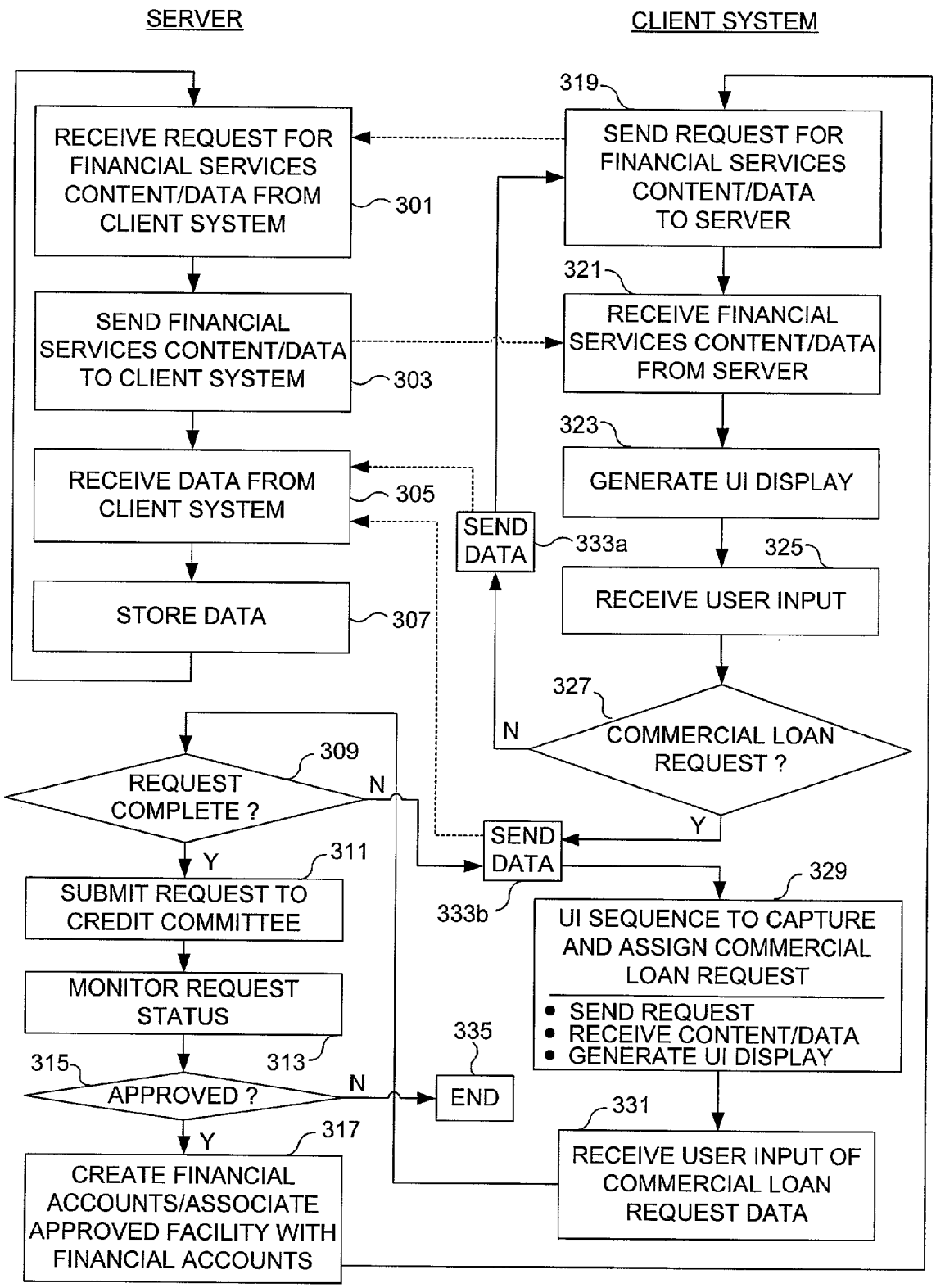
FIG. 3 is a flow diagram illustrating an embodiment of a flow of events in a server and in a client system in accordance with the teachings of the present invention.

With reference now primarily to FIG. 3, a flow diagram illustrating an embodiment of a flow of events in a server (e.g., the server 103, FIG. 1) and in a client system (e.g., the client systems 105 and/or 107, FIG. 1) is shown in accordance with the teachings of the present invention. As the following discussion proceeds with regard to FIG. 3, reference is made to FIGS. 4-21 to illustrate various aspects of the present invention. It will be appreciated that reference to "the client system 105, 107" is intended to refer to either or both of the client systems 105 and 107 illustrated in FIG. 1, as each may operate independently of the other. It will also be appreciated that in the following discussion, functionalities of the server 103 and/or the client systems 105 and 107 may be facilitated by the components illustrated in FIG. 2, as discussed above.

In one embodiment, a user, for example a loan officer or other financial institution administrator, may access a content site (e.g., a web site) maintained by the server 103 in order to input customer profile data and/or to prepare a commercial loan application at the request of the customer. Access to the content site may be facilitated via a unique address identifier such as a universal resource locator ("URL"), or the like, communicated via the network 109 (see, e.g., FIG. 1). In one embodiment, access to the content site may be facilitated by a commercially available browser application for example, stored and executed by the client system 105, 107. When the content site is accessed, the client system 105, 107 may send a request for financial services content and/or data to the server 103 (see, e.g., process block 319) via the communications interface 213 (see, e.g., FIG. 2).

The server 103 may then receive the request for financial services content and/or data from the client system 105, 107 (see, e.g., process block 301), and send the financial services content and/or data to the client system 105, 107 (see, e.g., process block 303) via the communications interface 213. As discussed above, the communication of requests from the client system 105, 107 to the server 103, and the communication of content and/or data from the server 103 to the client system 105, 107, may be facilitated by any one of a number of suitable network communication protocols, in an embodiment.

The client system 105, 107 may then receive the financial services content and/or data from the server 103 (see, e.g., process block 321), and generate a UI display in response thereto (see, e.g., process block 323). In one embodiment, a UI display corresponding to a content page (e.g., an HTML page) maintained by the server as part of the content site, such as that illustrated in FIG. 5, may be generated (e.g., by a browser application) to enable the user to log-on to the financial services site by entering a user name and password, for example. The client system 105, 107 may receive the user input (e.g., the user name and password) (see, e.g., process block 325) via the input/output interface 215 (see, e.g., FIG. 2), and send a request for additional content and/or data to the server 103 in response to the user input, in an embodiment. If the received user input (see, e.g., block 325) does not correspond to a commercial loan request selection (see, e.g., process block 327), then any input data may be communicated to the server 103 (see, e.g., process block 333a), and process blocks 319, 301, 303, 321, and 323 may be repeated as indicated in FIG. 3.

Figures 5, 6:
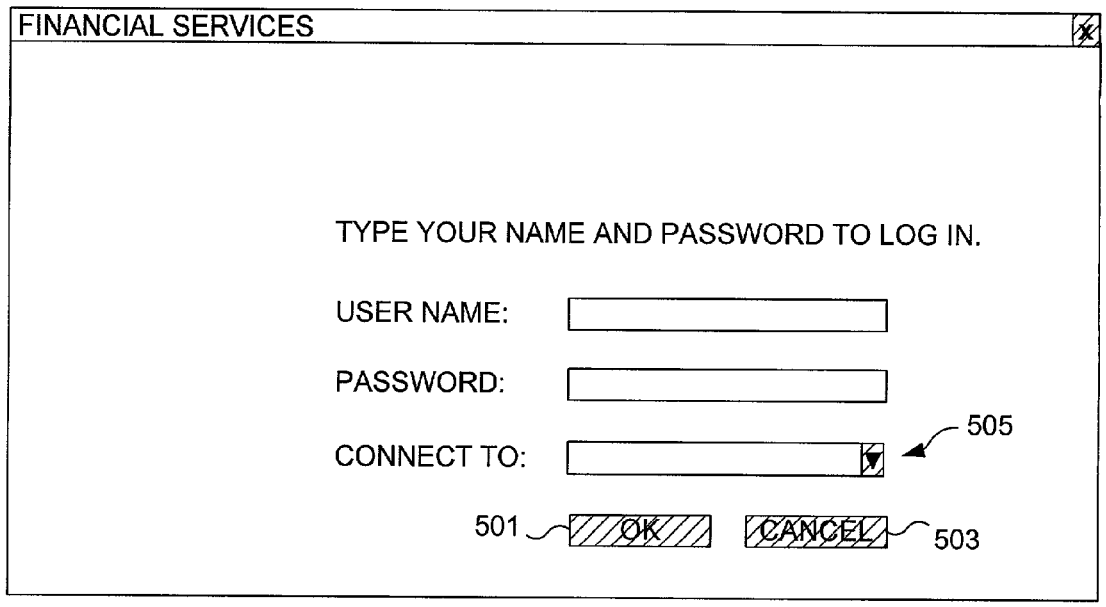

It will be appreciated that the log-on view UI display illustrated in FIG. 5 may not be necessary in all embodiments of the present invention, but may be provided as a security feature to prevent unauthorized access to the content site, and to the data associated therewith, maintained by the server 103. It will also be noted that in the various UI displays depicted in FIGS. 5-21, links to other content pages and/or actions are associated with user-actuateable "buttons" illustrated with diagonal lines, such as the "OK" and "CANCEL" buttons 501, 503, respectively, shown in FIG. 5.

For example, the user may enter the user name and password (collectively "data") to gain access to the financial services content site, and actuate (e.g., via an input/output device 217, FIG. 2) the "OK" button 501 to submit the data for processing (see, e.g., process block 305) by a software application being executed by the server 103. If the user name and password are accepted by the software application, then subsequent content and/or data may be communicated to the client system 105, 107 to cause generation of another UI display, for example a customer view UI display such as that illustrated in FIG. 6. In one embodiment, the subsequent UI display may be selected from a pull-down menu, such as the "CONNECT TO" menu 505 illustrated in FIG. 5.

With continued reference to FIG. 3, and to the foregoing example, the loan officer may then input new customer profile data into various data fields 602 of a company form applet 601, or may select to search for an existing customer's records via selection of a "QUERY" button 603, for example. In one embodiment, the user (e.g., the loan officer) may also select another new customer record by selecting the "NEW" button 605. If an existing customer's records are selected, pending commercial loan requests and accounts (e.g., merchant checking account, lines of credit, and the like) may be displayed (see, e.g., reference numerals 607 and 609, respectively) in scrollable list applets, for example. The client system may then again receive the user input (see, e.g., block 325) of information and/or data via the various data fields 602 of the company form applet 601, in an embodiment.

With continued reference to FIGS. 3 and 6, after having entered the customer profile data in the data fields 602, the user may then select a commercial loan request button 611, which may appear as an icon, for example, on a portion of the customer view UI display of FIG. 6. In one embodiment in accordance with the teachings of the present invention, selection of the commercial loan request button 611 (see, e.g., process block 327) may cause the customer profile data to be communicated to the server 103 (see, e.g., process block 333b), where the data may be received (see, e.g., process block 305), and stored (see, e.g., process block 307) in a communicatively coupled storage device, such as a relational database (e.g., the database 111, FIG. 1). Selection of the commercial loan request button 611 may also cause entry into a UI display sequence designed to enable the user to capture commercial loan application data and to assign a commercial loan request (see, e.g., process block 329). It will be appreciated that the commercial loan request button 611, or its equivalent, may appear in any one of a number of different forms, or may be activated by any one of a number of different mechanisms, in order to launch a UI display or sequence of UI displays to facilitate the capture of commercial loan application data, and assignment of the commercial loan request in accordance with the teachings of the present invention.

FIG. 4 is a flow diagram illustrating an embodiment of a sequence of UI displays for capturing commercial loan application data, and assigning and administering a commercial loan request in accordance with the teachings of the present invention. In the illustrated embodiment, the flow begins with the log-on view (see reference numeral 401) and the customer view (see reference numeral 403) illustrated in FIGS. 5 and 6, respectively, as discussed above. Blocks corresponding to these two views (401 and 403) are illustrated with dashed lines to indicate that they fall outside of the UI sequence as described in conjunction with process block 329 of FIG. 3, but are included to illustrate their relationship with the UI sequence. Following the customer view 403, the flow proceeds to a request view (see reference numeral 405), such as that illustrated in FIG. 7.

Figure 7:
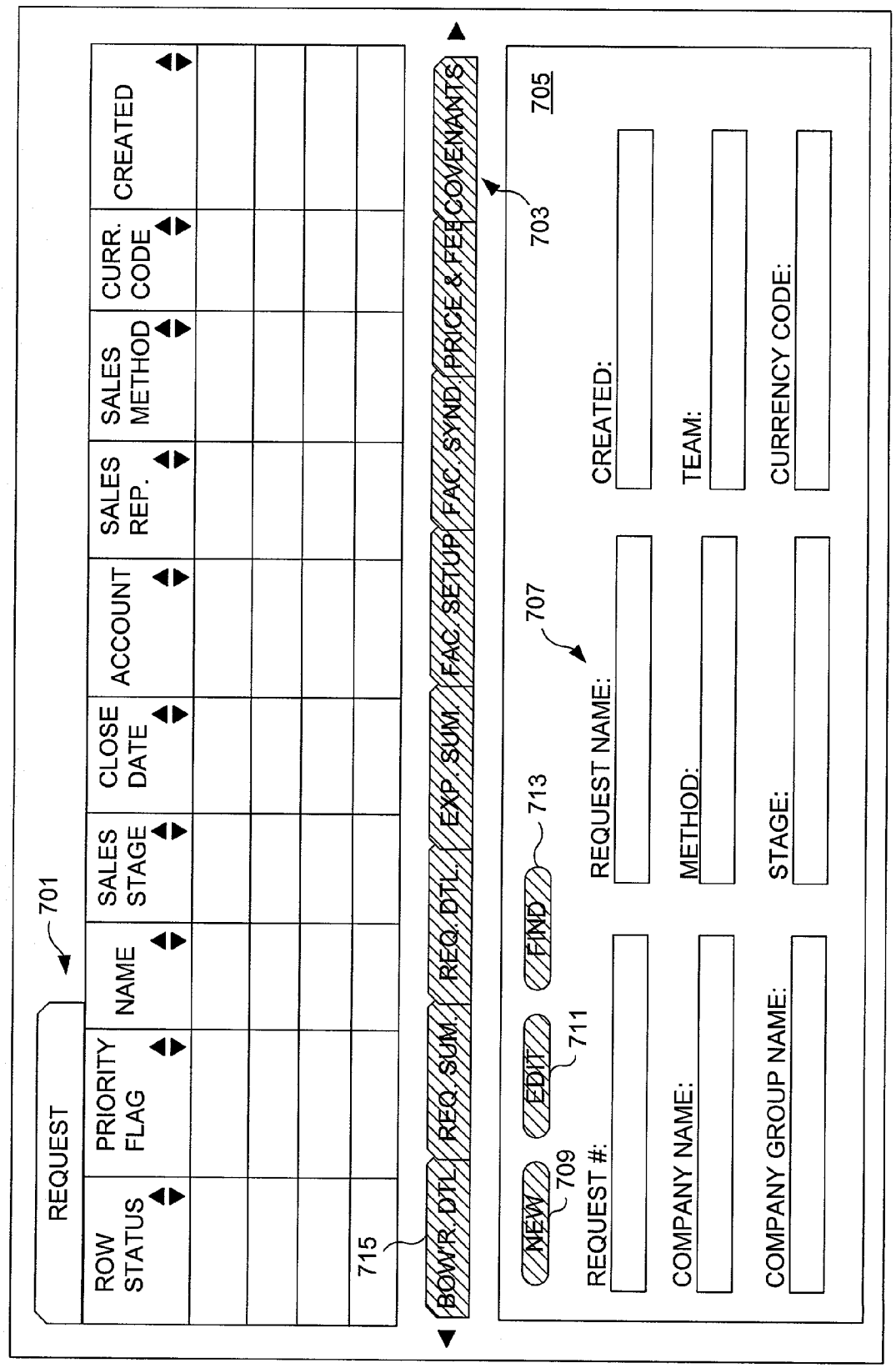

The request view UI display of FIG. 7 may be automatically accessed upon actuation of the commercial loan request button 611, in an embodiment, by sending a request to the server 103, and receiving content and/or data from the server 103 to cause generation of the UI display, as discussed above. The request view UI display of FIG. 7 includes, in one embodiment, a request header applet 701, a menu bar 703, and a request form applet 705 including a plurality of data fields 707 configured to receive commercial loan application data.

The request header applet 701 may, in an embodiment, comprise a list applet configured to display one or more commercial loan requests corresponding to the user-specified customer identified in the customer view UI display illustrated in FIG. 6. In order to create a new commercial loan request, the user may select a "NEW" button 709 on the request form applet 705. In addition, the user may edit or search for an existing request by selecting an "EDIT" button 711, or a "FIND" button 713, respectively, from the request form applet 705. The request view UI display of FIG. 7 may be used by the loan officer to create the commercial loan request for the customer, or by a credit committee to display commercial loan requests that need to be considered for approval, or that have been approved, in an embodiment.

When the user has finished entering all applicable information into the data fields of the request form applet 705 for the creation of a new commercial loan request, he or she may then proceed to capture the remainder of the commercial loan application data required for consideration of the request by selecting tabs (e.g., the borrower detail tab ("BOW'R DTL.") tab 715) from the menu bar 703. In one embodiment, the tabs may be selected by the user sequentially to ensure that all of the UI displays are accessed, and that all requisite commercial loan application data is captured for consideration by the review committee. It will be noted that the menu bar 703 may be scrollable (from right to left and vice versa, as illustrated in FIGS. 7-21), in an embodiment, and that tabs in addition to those illustrated in the depicted embodiments may also be included.

With continued reference to FIG. 3, having received user input of commercial loan request data (also "commercial loan application data") (see, e.g., process block 331), selection of a tab from the menu bar 703 initiates a determination regarding whether the commercial loan request is complete at this stage (see, e.g., process block 309). Since the loan request is not yet complete, the entered commercial loan request data is communicated to the server 103 (see, e.g., process block 333b), and the process enters an iterative loop beginning again at process block 329. Again, a request for the content and/or data corresponding to the next successive UI display (e.g., corresponding to the user-selected tab in the menu bar 703) is sent to the server 103, and the content and/or data is received by the client system 105, 107 to cause generation of the next successive UI display (see, e.g., block 329).

Figure 8:
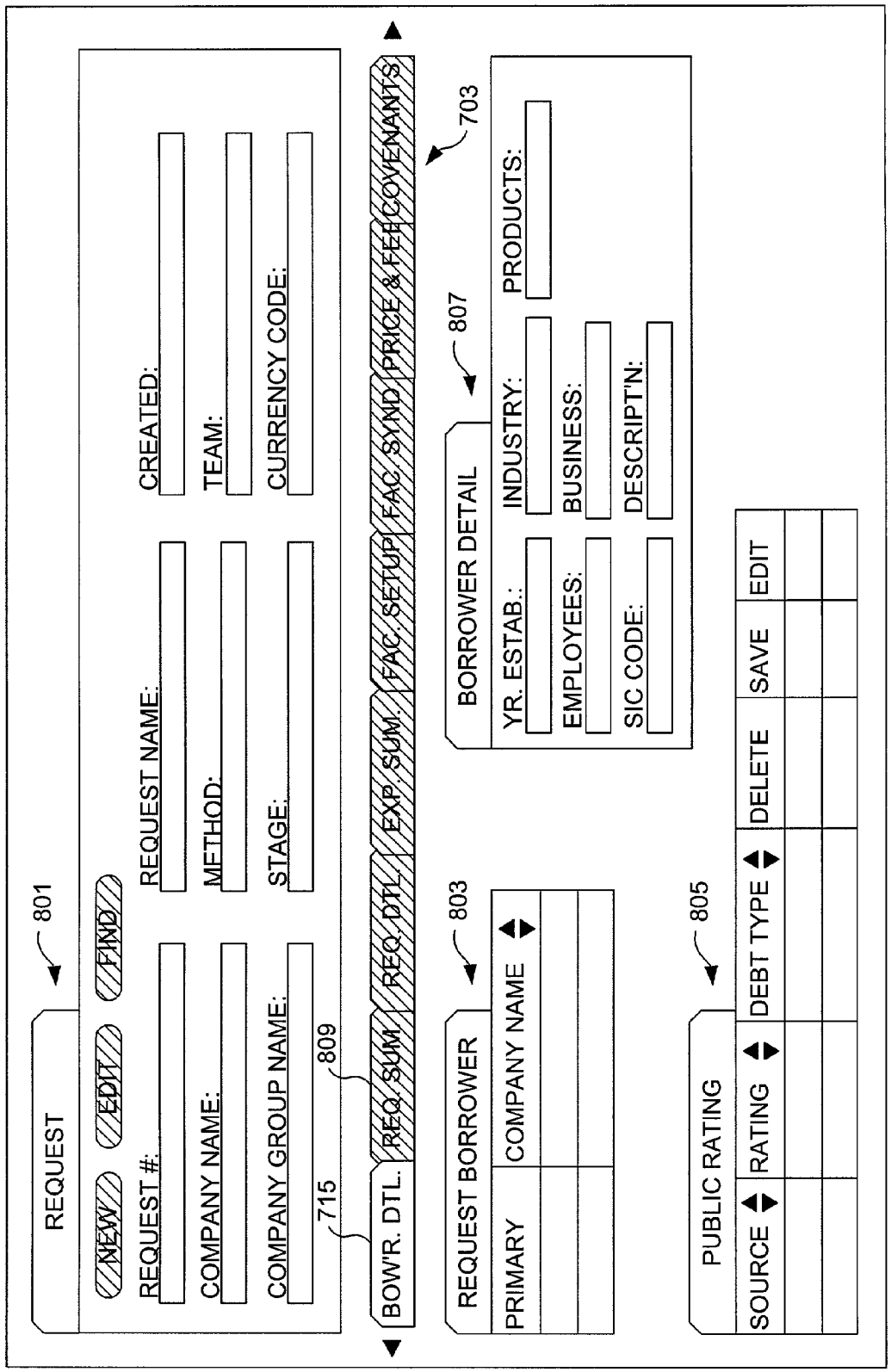

With continued reference to FIG. 4, the flow then next proceeds, via user actuation of a first tab in the menu bar 703 (e.g., the borrower detail tab 715) for example, to a borrower detail view (see reference numeral 407), such as that illustrated in FIG. 8. The borrower detail view UI display of FIG. 8 may include, in an embodiment, a request header applet 801, including data fields containing information specific to the currently selected (e.g., from the request header list applet 701, FIG. 7) commercial loan request (e.g., the new commercial loan request defined via the request form applet 705, FIG. 7). The borrower detail view UI display may also include the menu bar 703, and a request borrower list applet 803, which may list one or more companies as applicants in relation to the commercial loan request, designating one as a primary applicant. In addition, the borrower detail view UI display may include a borrower detail form applet 805 and a public rating list applet 807, in an embodiment. The public rating list applet 805 may show a debt rating for each company/borrower.

In one embodiment, fields of the borrower detail form applet 805 may be pre-populated with data (e.g., customer profile data) corresponding to a specific customer, previously provided by the customer and stored by the financial institution, via a request to the server 103 to provide such information/data from the database 111 (see, e.g., FIG. 1). The reader will recall that the customer profile data entered in the data fields 602 of the company form applet 601, as discussed above, was communicated to the server 103 (see, e.g., block 333b) for receipt and storage (see, e.g., blocks 305 and 307, respectively) in a database to be accessible via customer name, or other unique identifier.

After entry of all requisite information in the borrower detail view UI display of FIG. 8, the flow illustrated in FIG. 4 next proceeds, via user actuation of a subsequent tab in the menu bar 703 (e.g., a request summary ("REQ. SUM.") tab 809), to a request summary view (see reference numeral 409), such as that illustrated in FIG. 9. The request summary view UI display of FIG. 9 may include the request header applet 801, described above, as well as the menu bar 703, in an embodiment. The request summary view UI display may also include a key credit issues list applet 901, a decision list applet 903, and a request detail form applet 905, in an embodiment.

Figure 9:
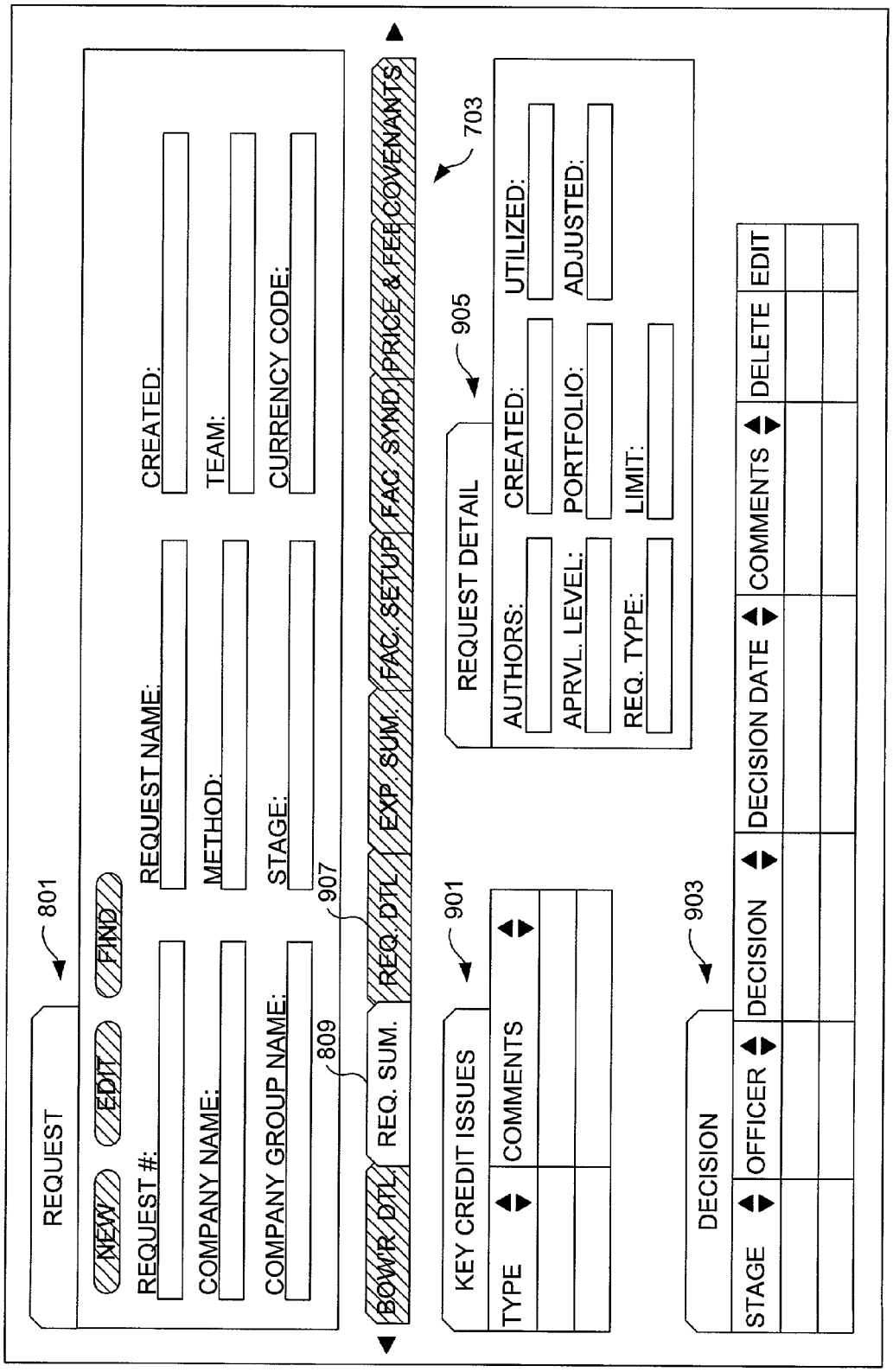

The request summary view UI display of FIG. 9 shows a summary of the commercial loan request, and will capture the decision from the review committee, in an embodiment. For example, the decision list applet 903 may track comments and approval from the review committee with regard to a selected commercial loan request. The key credit issues list applet 901 captures user-specified issues related to the current commercial loan request, such as for example, particularly relevant issues related to covenants or the like. The request detail form applet 905 enables the user to specify details related to the request, such as an approval level, and the like. In one embodiment in accordance with the teachings of the present invention, one or more of the data fields in the request detail form applet 905 may be populated with data entered via administration UI displays that will be discussed in greater detail hereinbelow.

With continued reference to FIG. 4, the flow then next proceeds, via user actuation of the next tab in the menu bar 703 (e.g., a request detail ("REQ. DTL.") tab 907) for example, to a request detail view (see reference numeral 411), such as that illustrated in FIG. 10. The request detail view UI display of FIG. 10 may include the request header applet 801, described above, as well as the menu bar 703, in an embodiment. The request detail view UI display may also include an underwriting standard list applet 1001 and a request policy exceptions list applet 1003, in an embodiment. Some of the fields of the underwriting standard list applet 1001 may be populated with standard information based on a portfolio choice defined in the request detail form applet 905 of the request summary view UI display illustrated in FIG. 9. In one embodiment, one or more of the fields of the underwriting standard list applet 1001 may be populated with data entered via administration UI displays that will be discussed below.

The request policy exceptions list applet 1003 may be configured to capture any policy exceptions for the current commercial loan request. For example, each lender generally has a set of policies that must be complied with in regard to a commercial loan request (e.g., agent's limit, legal lending limit, and the like). If the policy is to be violated in regard to the request, an exception must generally be defined, or the request may not be approved.

Figure 10:
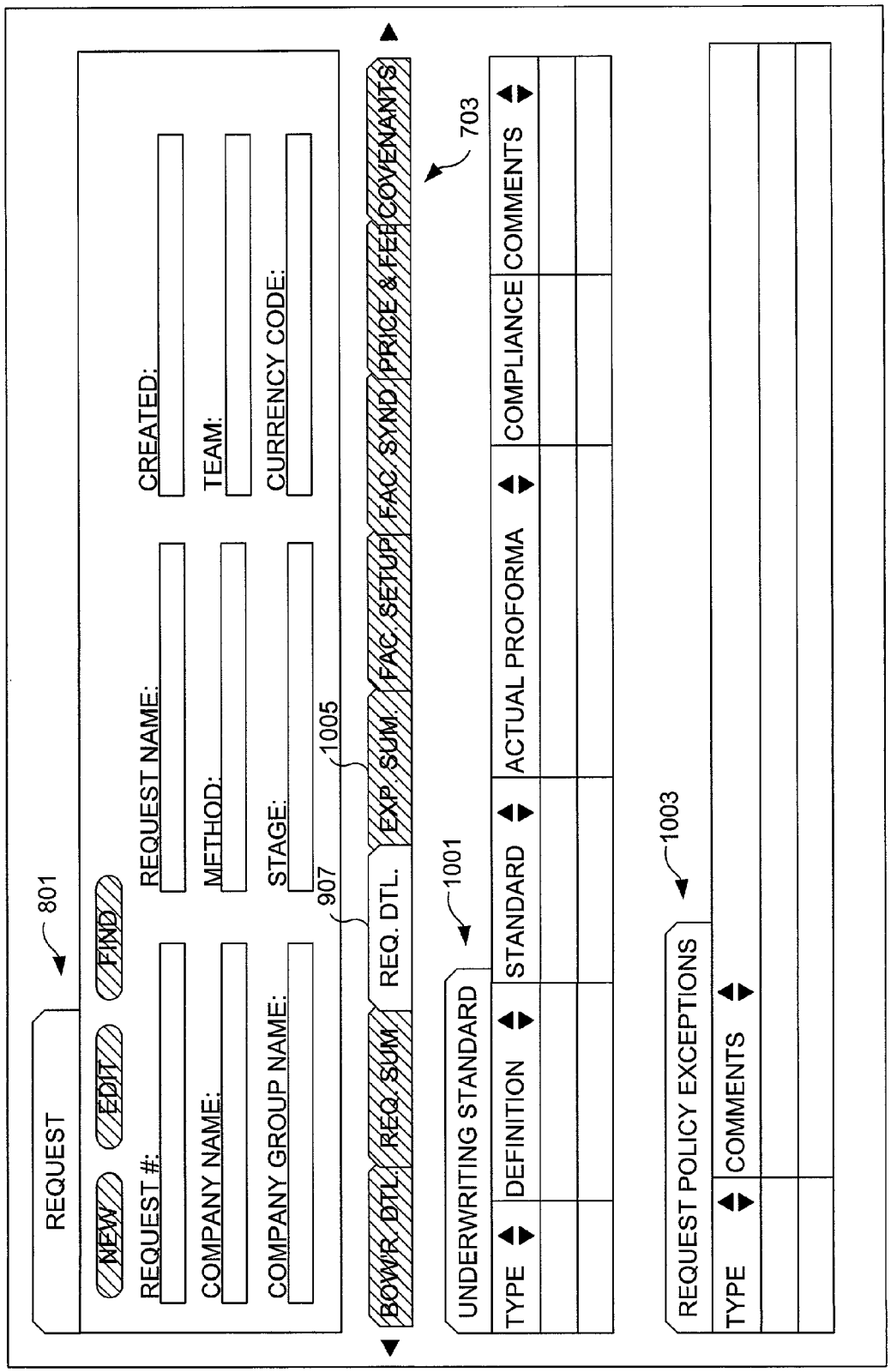

After entry of all requisite information in the request detail view UI display of FIG. 10, the flow illustrated in FIG. 4 next proceeds, via user actuation of the next tab in the menu bar 703 (e.g., an exposure summary ("EXP. SUM.") tab 1005) for example, to an exposure summary view (see reference numeral 413), such as that illustrated in FIG. 11. The exposure summary view UI display of FIG. 11 may include the request header applet 801, described above, as well as the menu bar 703, in an embodiment. The exposure summary view UI display may also include a group exposure list applet 1101 and a group exposure form applet 1103, in an embodiment.

Figure 11:
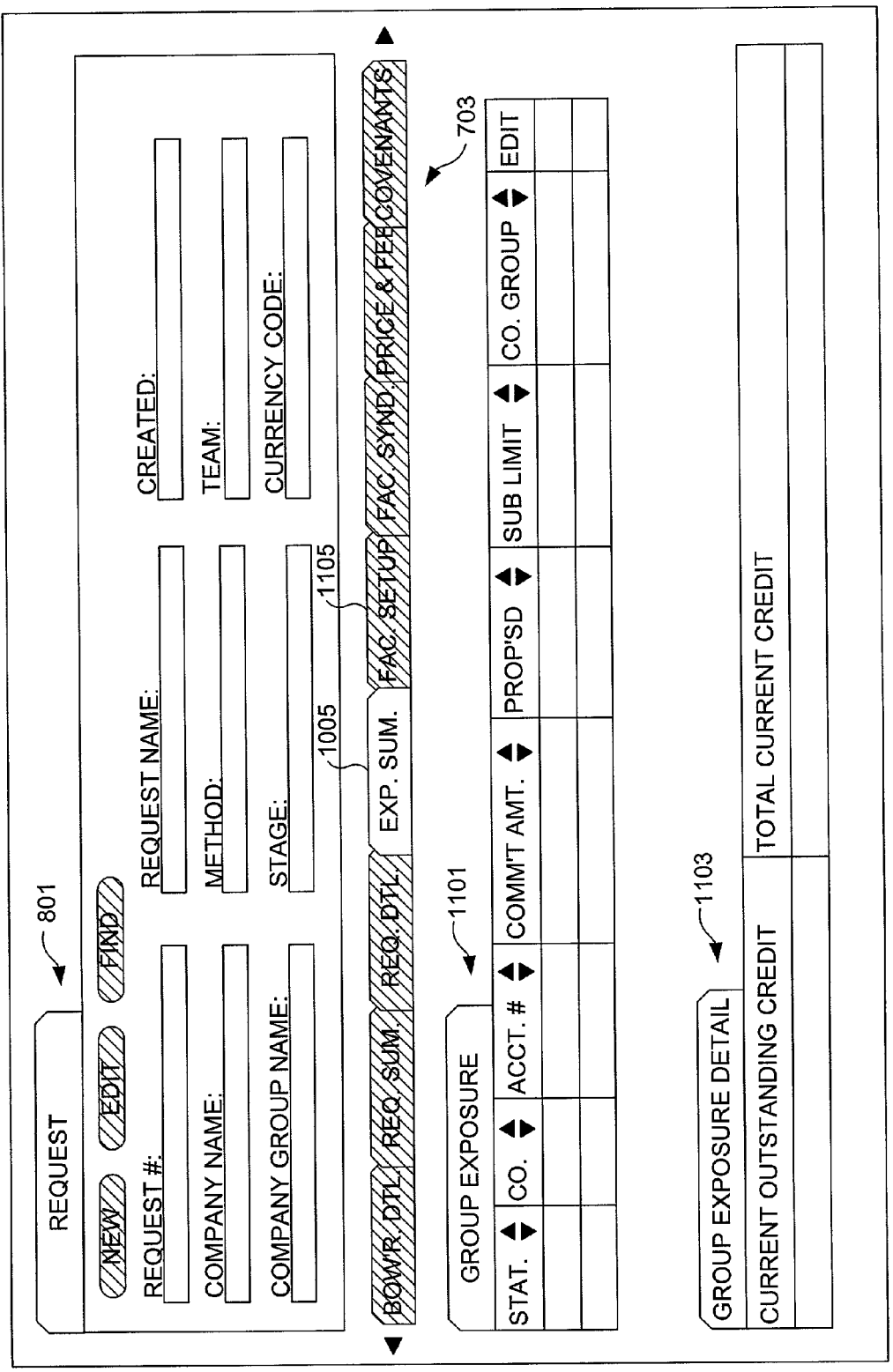

The exposure summary view UI display of FIG. 11 shows a group exposure corresponding to the company group name defined in the request header applet 801. In one embodiment, the company group name may correspond to a company and its subsidiaries. The group exposure list applet 1101 may show all requests that have been approved and booked for the company group. In one embodiment, fields of the group exposure list applet 1101 may be populated by data from a financial account view (e.g., corresponding to a parent company for the group) that will be discussed below.

With continued reference to FIG. 4, the flow then next proceeds, via user actuation of the next tab in the menu bar 703 (e.g., a facility (i.e. loan) setup ("FAC. SETUP") tab 1105) for example, to a facility setup view (see reference numeral 415), such as that illustrated in FIG. 12. The facility setup view UI display of FIG. 12 may include the request header applet 801, described above, as well as the menu bar 703, in an embodiment. The facility setup view UI display may also include a borrower list applet 1201, a loan facility list applet 1203, and a loan facility detail form applet 1205, in an embodiment.

The borrower list applet 1201 may display a list of the borrowers/applicants associated with the current commercial loan request, while the loan facility list applet 1203 may display all those facilities currently associated with any one of the borrowers selected from the borrower list applet 1201. When the user selects an existing facility from the loan facility list applet 1203, at least a portion of the fields of the loan facility detail form applet may be populated with data from the financial account view corresponding to the facility, which will be discussed below.

Figure 12:
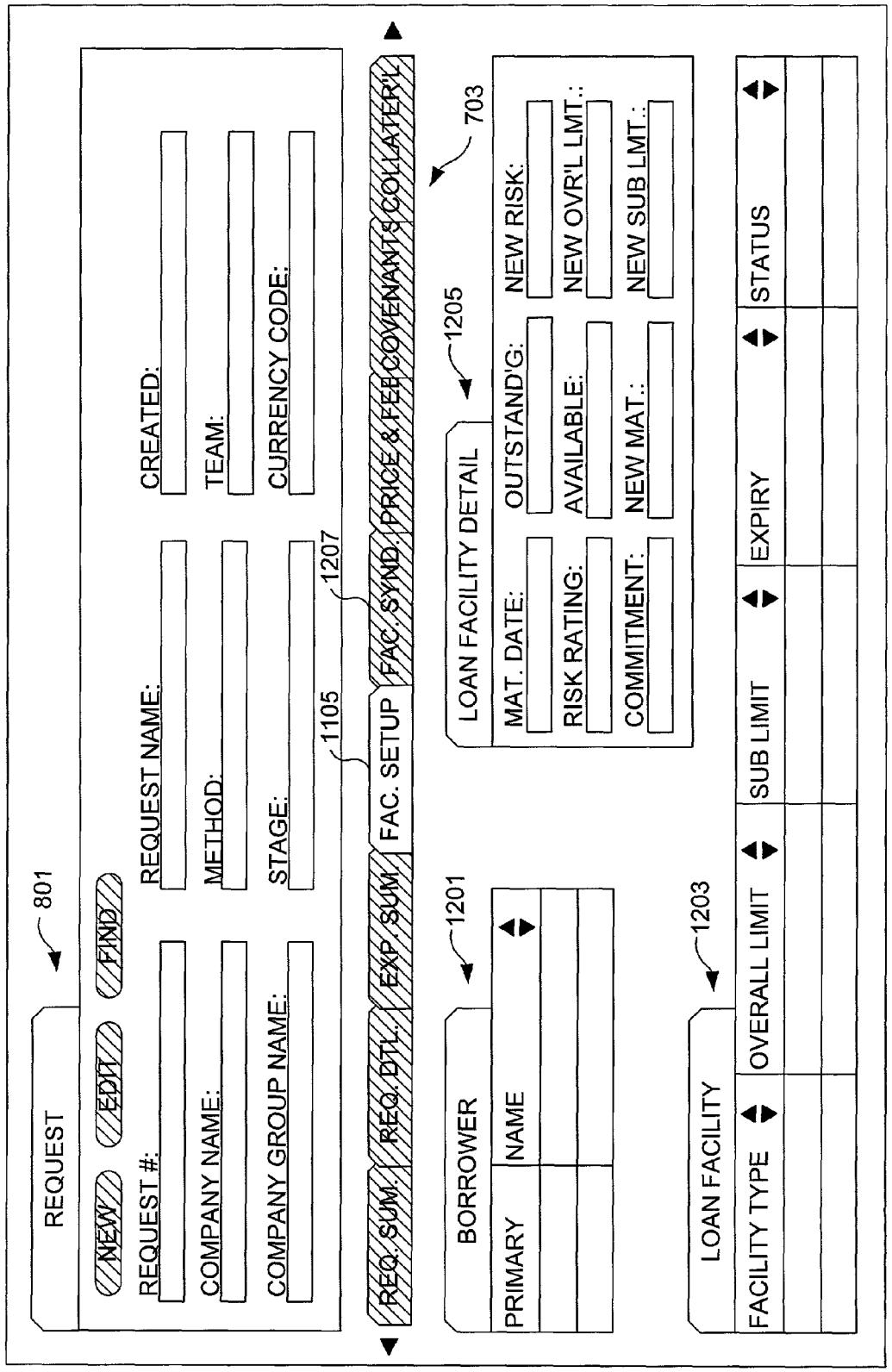

After entry of all requisite information in the facility setup view UI display of FIG. 12, the flow illustrated in FIG. 4 next proceeds, via user actuation of the next tab in the menu bar 703 (e.g., a facility syndication ("FAC. SYND.") tab 1207) for example, to a facility syndication view (see reference numeral 417), such as that illustrated in FIG. 13. The facility syndication view UI display of FIG. 13 may include the request header applet 801, described above, as well as the menu bar 703, in an embodiment. The facility syndication view UI display may also include the borrower list applet 1201 and the loan facility list applet 1203 illustrated in FIG. 12, as well as a syndication detail form applet 1301 and a bank syndication list applet 1303, in an embodiment.

Figure 13:
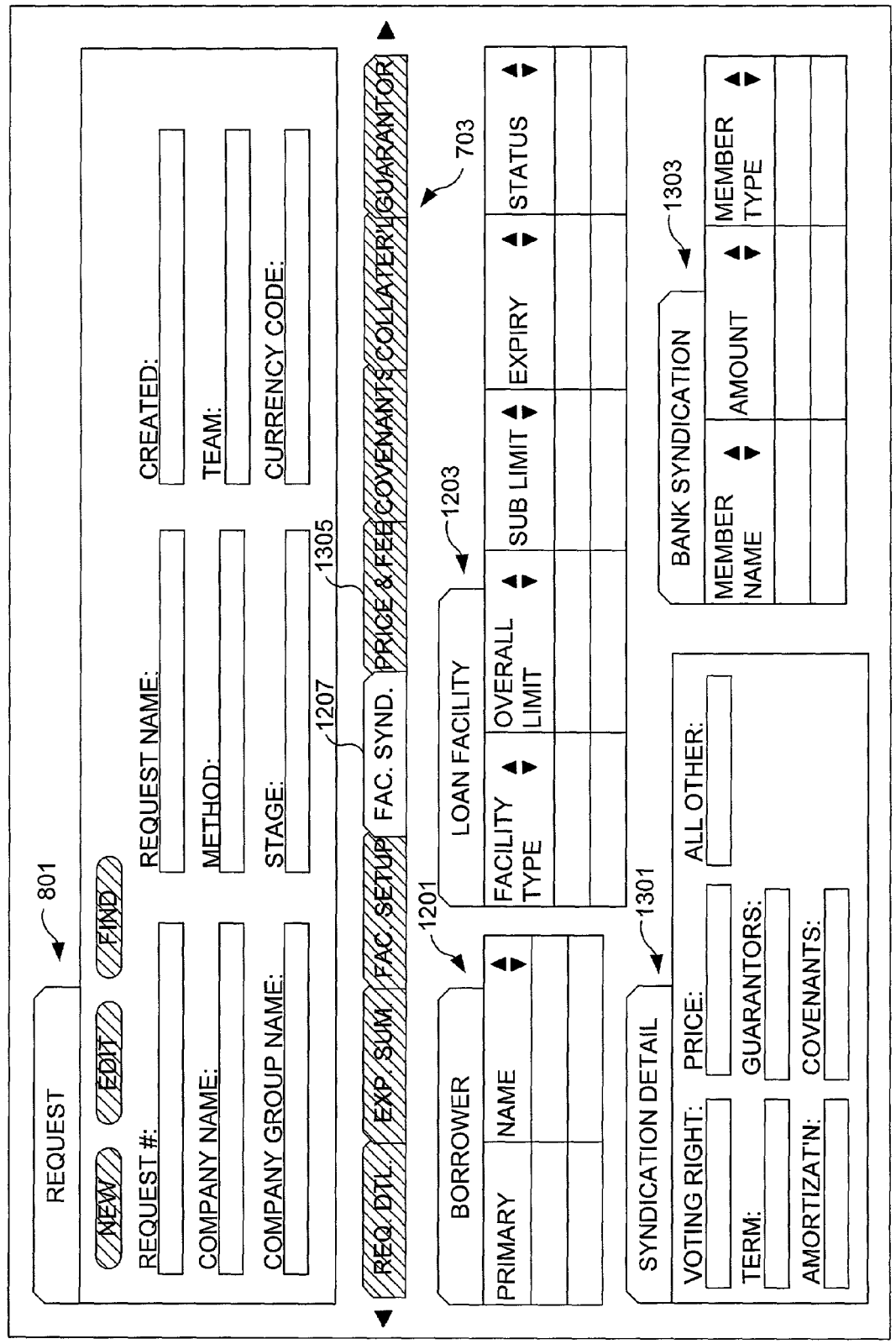

The facility syndication view UI display of FIG. 13 may be configured to capture bank syndication information. For example, many times, a loan requested by a customer is too big for one bank to finance on its own. Syndication allows the bank to split the loan among several bank or lending institutions. In the illustrated view, the user may highlight a facility (e.g., corresponding to a borrower shown in the borrower list applet 1201) listed in the loan facility list applet 1203, and associate that facility with one or more lenders via the bank syndication list applet 1303, in an embodiment. Details regarding each bank in the bank syndication list applet 1303 may be input via the syndication detail form applet 1301, in an embodiment.

Figure 14:
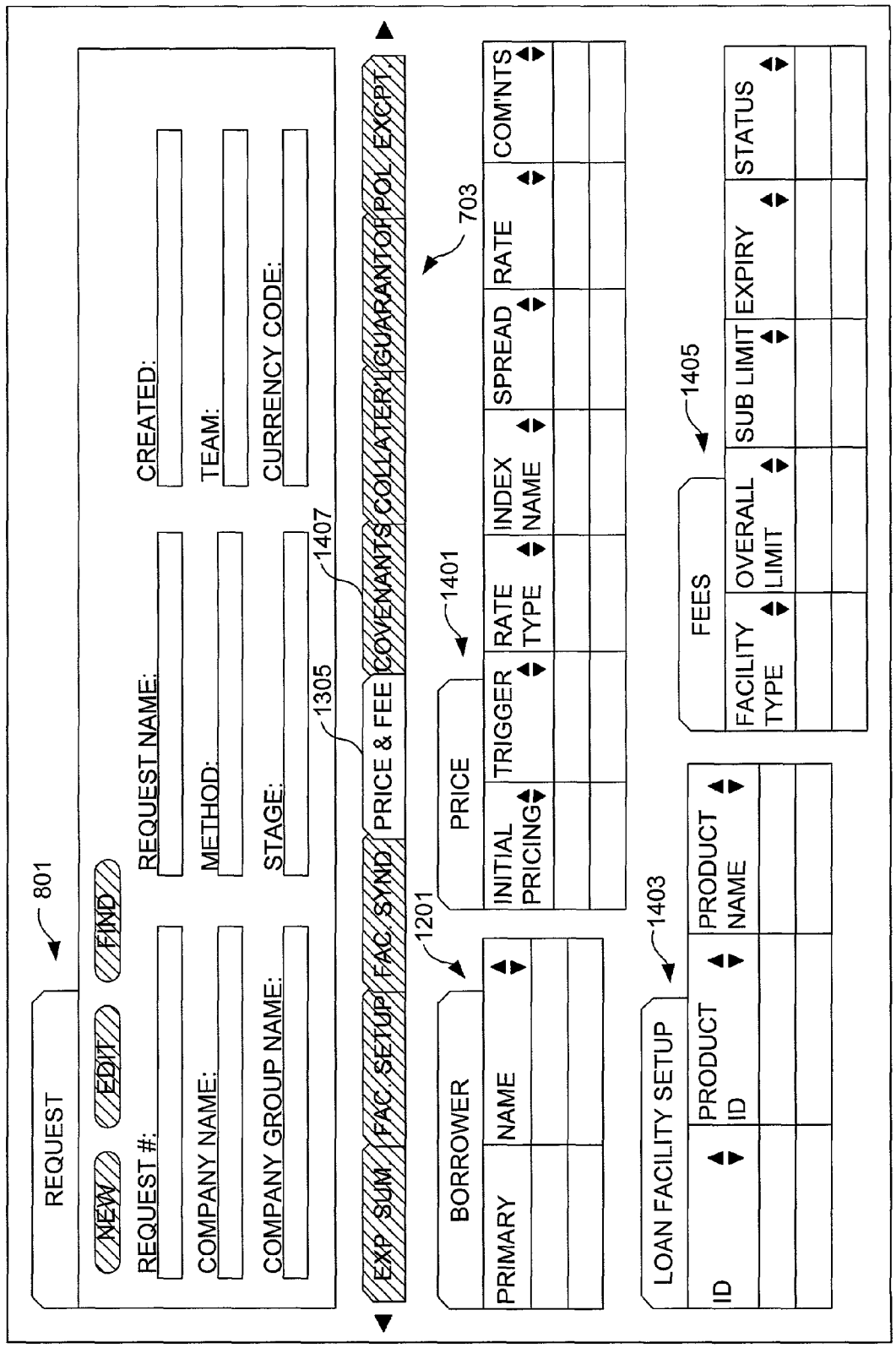

With continued reference to FIG. 4, the flow then next proceeds, via user actuation of the next tab in the menu bar 703 (e.g., a price and fees ("PRICE & FEE") tab 1305) for example, to a price and fees view (see reference numeral 419), such as that illustrated in FIG. 14. The price and fees view UI display of FIG. 14 may include the request header applet 801, described above, as well as the menu bar 703, in an embodiment. The price and fees view UI display may also include the borrower list applet 1201 (see, e.g., FIG. 12), as well as a price list applet 1401, a loan facility setup list applet 1403, and a fees list applet 1405, in an embodiment.

The price and fees view 111 display of FIG. 14 shows the price and fees for a facility. The user may highlight a facility from the loan facility setup list applet 1403 (e.g., corresponding to the selected borrower from the borrower list applet 1201), and set a price and fees for the facility via the price list applet 1401 and the fees list applet 1405, respectively. In one embodiment, fields of the price list applet 1401 and the fees list applet 1405 may be pre-populated with data corresponding to a particular product type.

Figure 15:
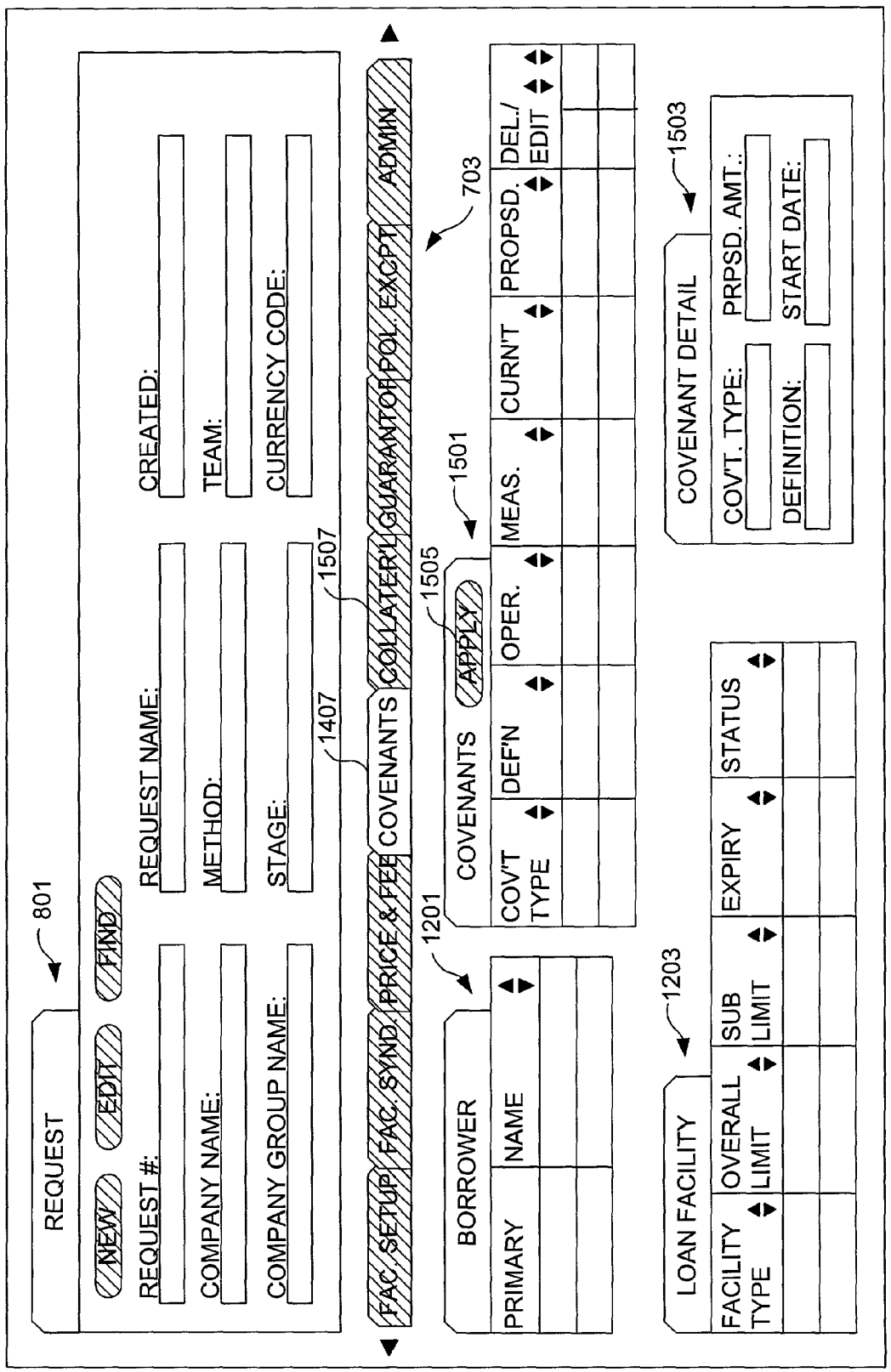

After entry of all requisite information in the price and fees view UI display of FIG. 14, the flow illustrated in FIG. 4 next proceeds, via user actuation of the next tab in the menu bar 703 (e.g., a covenants ("COVENANTS") tab 1407) for example, to a covenants view (see reference numeral 421), such as that illustrated in FIG. 15. The covenants view UI display of FIG. 15 may include the request header applet 801, described above, as well as the menu bar 703, in an embodiment. The covenants view UI display may also include the borrower list applet 1201 and the loan facility list applet 1203 illustrated in FIG. 12, as well as a covenants list applet 1501 and a covenant detail form applet 1503, in an embodiment.

The covenants view UI display of FIG. 15 may be configured, in an embodiment, to capture commercial loan application data corresponding to covenants related to a facility. A covenant is a condition that the borrower must meet in order to secure the loan and remain in good standing with the lender, such as submit a financial statement each quarter, or the like. The user may select a facility from the loan facility list applet 1203 (e.g., corresponding to the selected borrower in the borrower list applet 1201), and apply one or more covenants thereto via the covenants list applet 1501. Covenants may be defined for the covenants list applet 1501 via the covenant detail form applet 1503, in an embodiment. In one embodiment, the user may select a facility from the loan facility list applet 1203 such that the facility's corresponding covenants will be displayed in the covenants list applet 1501. To apply these covenants to another facility, the user need only select an "APPLY" button 1505, and then select a second facility from the loan facility list applet 1203 to apply the covenants, corresponding to the first selected facility, to the second selected facility.

Figure 16:
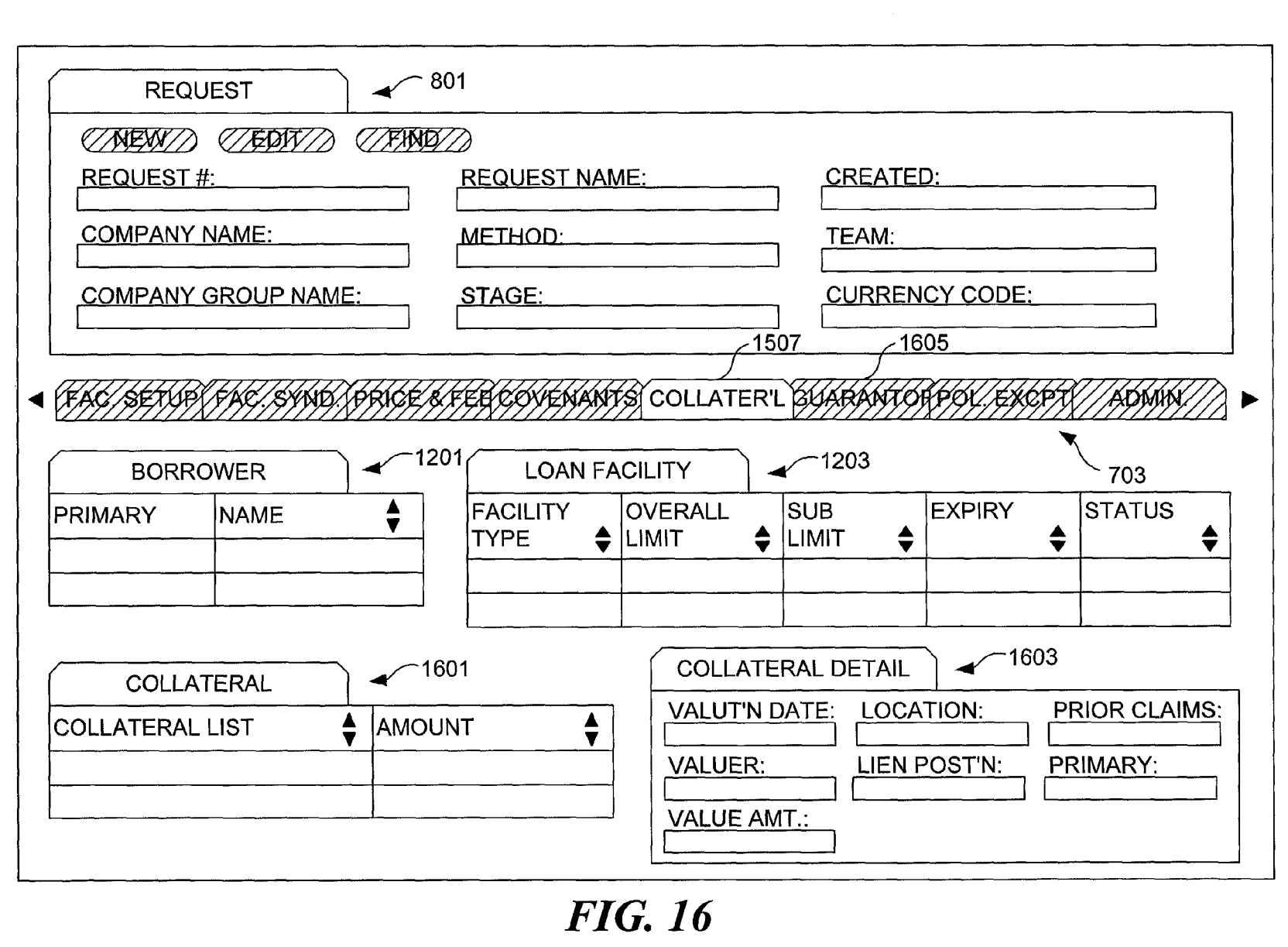

With continued reference to FIG. 4, the flow then next proceeds, via user actuation of the next tab in the menu bar 703 (e.g., a collaterals ("COLLATER'L") tab 1507) for example, to a collaterals view (see reference numeral 423), such as that illustrated in FIG. 16. The collaterals view UI display of FIG. 16 may include the request header applet 801, described above, as well as the menu bar 703, in an embodiment. The collaterals view UI display may also include the borrower list applet 1201 and the loan facility list applet 1203 illustrated in FIG. 12, as well as a collateral list applet 1601 and a collateral detail form applet 1603, in an embodiment.

The collaterals view UI display of FIG. 16 may be configured, in an embodiment, to capture commercial loan application data corresponding to collateral for each facility. As described above, the user may highlight a facility from the loan facility list applet 1203 (e.g., corresponding to a selected borrower in the borrower list applet 1201), and define collateral corresponding to that facility in the collateral list applet 1601. Details regarding each element of collateral shown in the collateral list applet 1601 may be defined in the collateral detail form applet 1603, in an embodiment.

Figure 17:
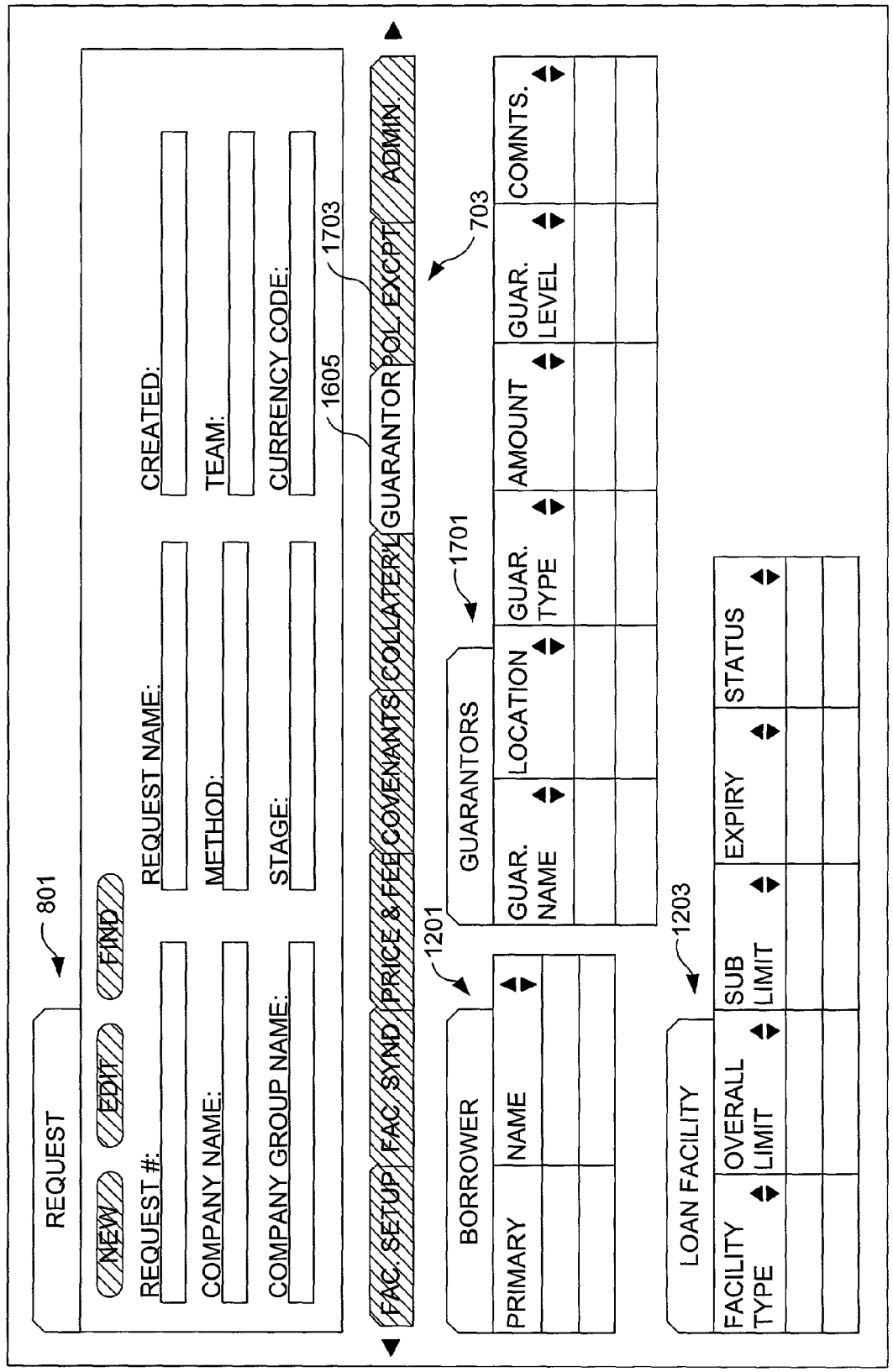

After entry of all requisite information in the collaterals view UI display of FIG. 16, the flow illustrated in FIG. 4 next proceeds, via user actuation of the next tab in the menu bar 703 (e.g., a guarantors ("GUARANTOR") tab 1605) for example, to a guarantors view (see reference numeral 425), such as that illustrated in FIG. 17. The guarantors view UI display of FIG. 17 may include the request header applet 801, described above, as well as the menu bar 703, in an embodiment. The guarantors view UI display may also include the borrower list applet 1201 and the loan facility list applet 1203 illustrated in FIG. 12, as well as a guarantors list applet 1701, in an embodiment.

The guarantors view UI display of FIG. 17 may be configured, in an embodiment, to capture commercial loan application data corresponding to guarantors for the facility. The user may highlight a facility in the loan facility list applet 1203 (e.g., corresponding to a selected borrower in the borrower list applet 1201), and associate one or more guarantors with the facility via the guarantors list applet 1701.

With continued reference to FIG. 4, the flow then next proceeds, via user actuation of the next tab in the menu bar 703 (e.g., a policy exceptions ("POL. EXCPT.") tab 1703) for example, to a policy exceptions view (see reference numeral 427), such as that illustrated in FIG. 18. The policy exceptions view UI display of FIG. 18 may include the request header applet 801, described above, as well as the menu bar 703, in an embodiment. The policy exceptions view UI display may also include the borrower list applet 1201 and the loan facility list applet 1203 illustrated in FIG. 12, as well as a borrower policy exception list applet 1801 and a loan facility policy exception list applet 1803, in an embodiment.

Figure 18:
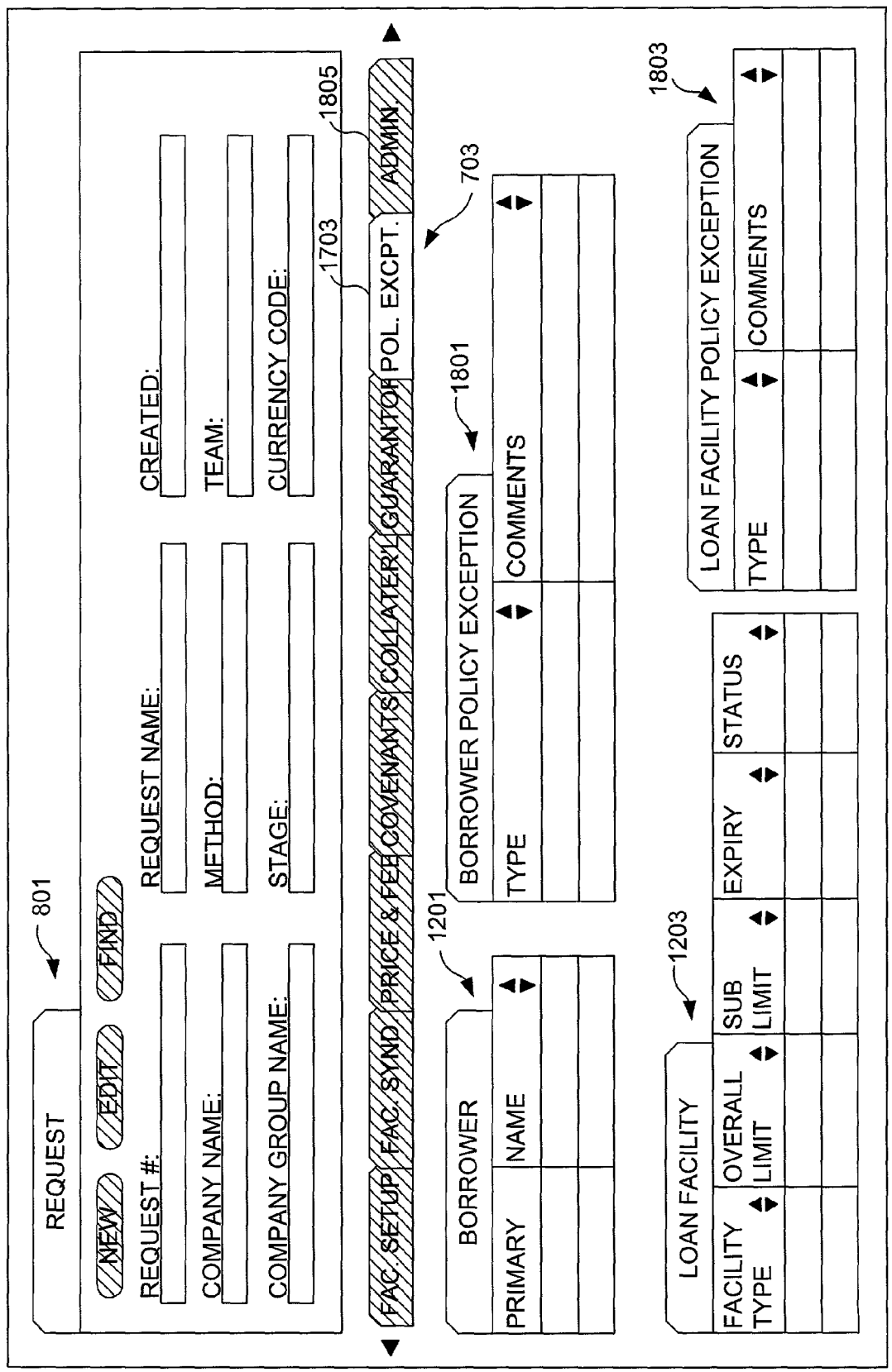

The policy exceptions view UI display of FIG. 18 may be configured, in an embodiment, to capture commercial loan application data corresponding to policy exceptions of the borrowers and the facilities, in an embodiment. It will be appreciated that the policy exceptions defined in regard to the policy exceptions view UI display are different from the exceptions defined in the request policy exceptions list applet 1003 shown in request detail view UI display of FIG. 10. In the policy exceptions view UI display of FIG. 18, the user may define exceptions for a borrower (selected from the borrower list applet 1201) via the borrower policy exception list applet 1801. Similarly, the user may define exceptions for a facility (selected from the loan facility list applet 1203) via the loan facility policy exception list applet 1803, in an embodiment.

Figure 19:
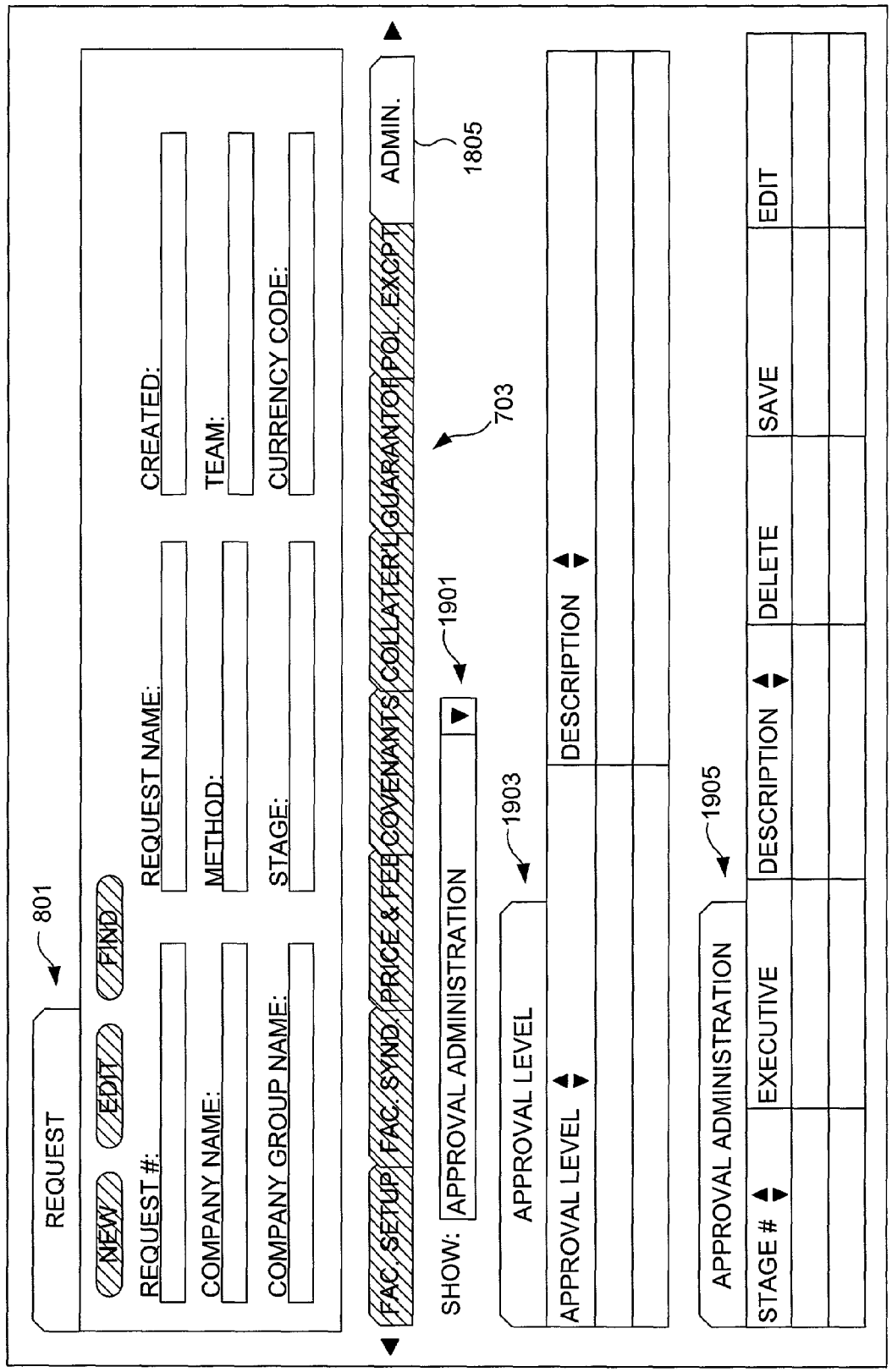

After entry of all requisite information in the policy exceptions view UI display of FIG. 18, the flow illustrated in FIG. 4 next proceeds, via user actuation of the next tab in the menu bar 703 (e.g., an administration ("ADMIN.") tab 1805) for example, to an approval administration view (see reference numeral 429), such as that illustrated in FIG. 19. The approval administration view UI display of FIG. 19 may include the request header applet 801, described above, as well as the menu bar 703, in an embodiment. The approval administration view UI display may also include pull-down menu bar 1901 corresponding to the administration tab 1805 of the menu bar 1703, from which the user may select to display the approval administration-associated applets: An approval level list applet 1903; and an approval administration list applet 1905, in an embodiment.

The approval administration view UI display of FIG. 19 may be configured, in an embodiment, to capture commercial loan application data corresponding to an approval level, an approval stage, and identification of individuals associated with each stage, in an embodiment. The user may define an approval level (e.g., manager's approval, vice-president approval, or the like) via the approval level list applet 1903, and then create stages and associate executives with each stage in the approval administration list applet 1905, in an embodiment. Individuals defined in the approval administration list applet 1905 may, in an embodiment, populate an "OFFICER" column in the decision list applet 903 of the request summary view UI display illustrated in FIG. 9.

Figure 20:
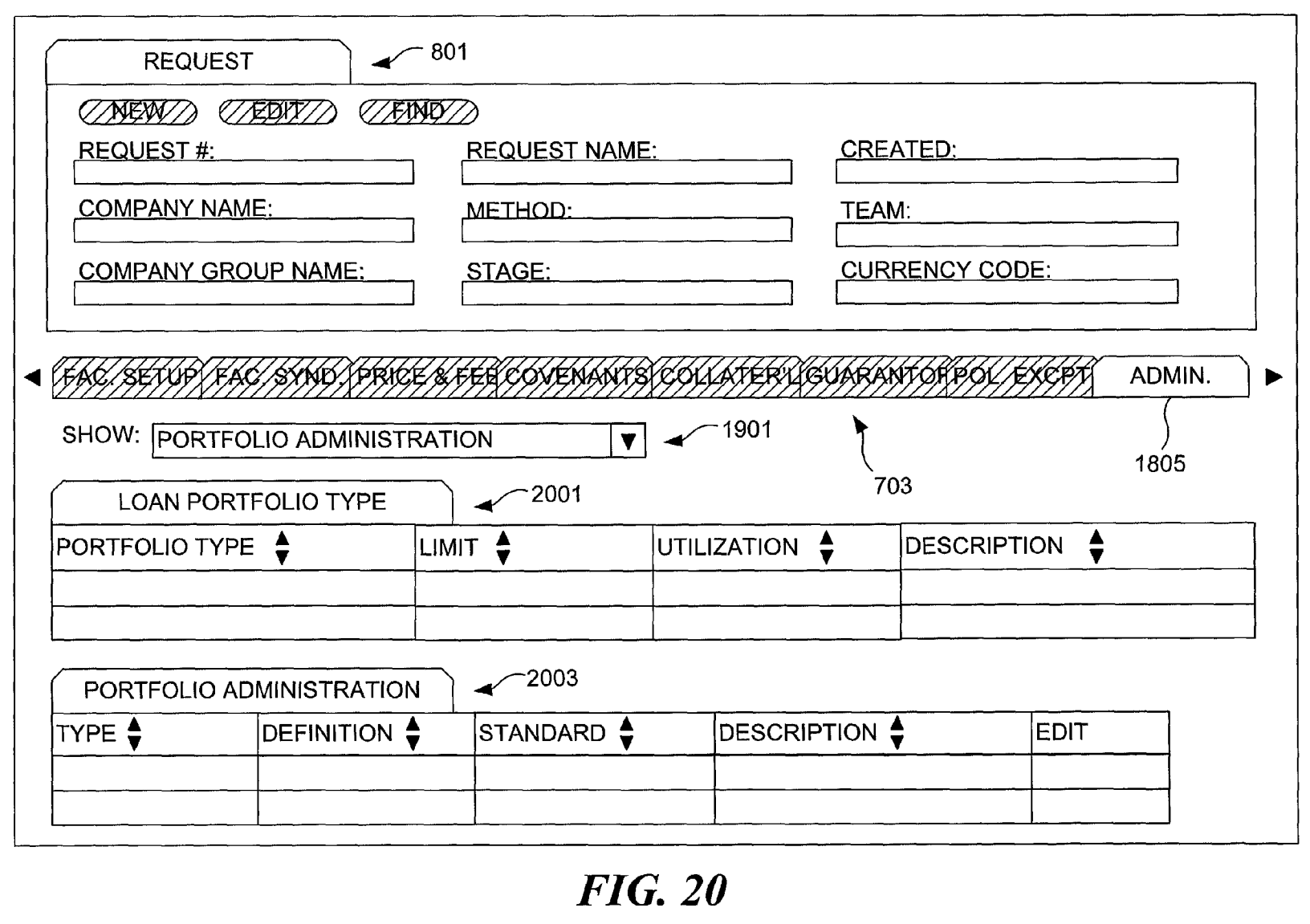

With continued reference to FIG. 4, the flow then next proceeds, via user selection from the pull-down menu 1901 for example, to a portfolio administration view (see reference numeral 431), such as that illustrated in FIG. 20. The portfolio administration view UI display of FIG. 20 may include the request header applet 801, described above, as well as the menu bar 703, in an embodiment. The portfolio administration view UI display may also include the pull-down menu 1901, as well as a loan portfolio type list applet 2001 and a portfolio administration list applet 2003, in an embodiment.

The portfolio administration view UI display of FIG. 20 may be configured, in an embodiment, to enable the user to set a portfolio type, and an underwriting standard associated with the portfolio type. The user may create a portfolio type (e.g., software industry) in the loan portfolio type list applet 2001 and define a limit and utilization to correspond to that portfolio type. In one embodiment, the limit and utilization will populate the request detail form applet 905 in the request summary view UI display illustrated in FIG. 9. In addition, the user may highlight a portfolio from the loan portfolio type list applet 2001 and create one or more underwriting standards in the portfolio administration list applet 2003, in an embodiment. The defined standard(s) may then populate the underwriting standard list applet 1001 in the request detail view UI display illustrated in FIG. 10, in an embodiment.

With reference again to FIG. 3, at this point the commercial loan request has been completed (see, e.g., block 309), assuming all of the requisite information has been provided via the UI displays illustrated in FIGS. 7-20 and described above. The commercial loan request is then submitted to the review committee for consideration (see, e.g., process block 311) and the status of the review may be monitored (see, e.g., process block 313) via the decision list applet 903 in the request summary view UI display, in an embodiment, as described above. If the request is not approved (see, e.g., process block 315), then the process ends (see, e.g., process block 335). If the commercial loan request is approved by the review committee (see, e.g., block 315), then the user may create financial accounts and/or associate the approved facility with one or more financial accounts (see, e.g., process block 317).

Figure 21:
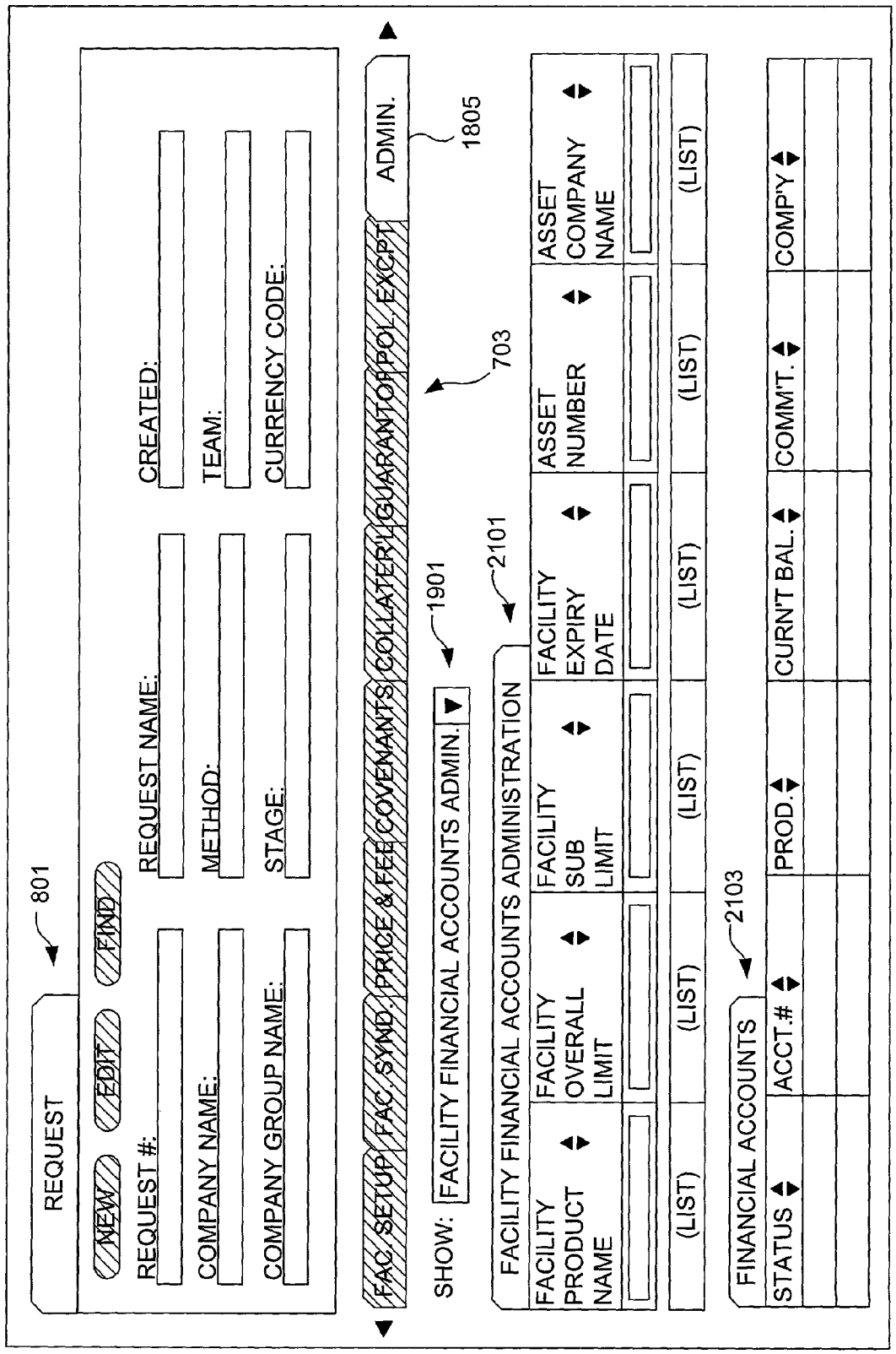

In one embodiment, creation of financial accounts, and association of approved facilities with one or more financial accounts may be facilitated via a facility financial accounts administration view (see reference numeral 433, FIG. 4), such as that illustrated in FIG. 21. The block 433 corresponding to the facility financial accounts administration view illustrated in FIG. 4 is shown with dashed lines to indicate that it is not a part of the UI sequence described in conjunction with process block 329 of FIG. 3 in a manner similar to the log-on view 401 and the customer profile view 403, but is shown to indicate its relationship to the UI sequence views in the flow illustrated in FIG. 4.

In one embodiment, the facility financial accounts administration view UI display of FIG. 21 may be accessed by the user, via selection of the administration tab 1805 and selection of a facility financial accounts administration option from the pull-down menu 1901 in conjunction with the approved request, as defined by the request header applet 801. In the illustrated embodiment, the facility financial accounts administration view UI display includes, in addition to the request header applet 801, the menu bar 703, and the pull-down menu 1901, a facility financial accounts administration list applet 2101 and a financial accounts list applet 2103.

In one embodiment in accordance with the teachings of the present invention, once the facility has been approved, the user may create a financial account for the facility. A financial account may be created for each borrower, in an embodiment. After creating one or more financial accounts via the financial accounts list applet 2103, the user may associate the approved facility, selected from the facility financial accounts administration list applet 2101, with one or more defined accounts from the financial accounts list applet 2103. In one embodiment, fields in the group exposure detail form applet 1103 of the exposure summary view UI display of FIG. 11, and the loan facility detail form applet 1205 of the facility setup view UI display of FIG. 12, may be populated with data from the financial accounts list applet 2103.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method, comprising:
   communicating a user interface to a client system via a network communication link, the user interface comprising a first user interface display of a plurality of user interface displays configured to capture commercial loan application data, wherein
     the plurality of user interface displays are further configured to facilitate preparation of a commercial loan request for a customer, using the commercial loan application data;
   receiving one or more portions of the commercial loan application data from the client system via the network communication link as each portion of the one or more portions of commercial loan application data is captured by the first user interface display;
   storing the one or more portions of received commercial loan application data in a storage device;
   communicating at least a first portion of the received commercial loan application data to the client system, wherein
     the client system uses the first portion of the received commercial loan application data to pre-populate at least one data field of a second user interface display of the plurality of user interface displays;
   assigning the commercial loan request to a reviewer of a lending facility; and
   subsequent to approval of the commercial loan request by the lending facility, creating a financial account for the customer, and
     associating the lending facility with the financial account.

2. The method of claim 1, wherein
   the plurality of user interface displays are further configured to capture lending facility syndication information, and
   the lending facility syndication information indicates the commercial loan request is split among several lending facilities.

3. The method of claim 2, wherein the plurality of user interface displays are further configured to monitor a status of review corresponding to the commercial loan request.

4. The method of claim 3, wherein the plurality of user interface displays are further configured to administer association of accounts with approved commercial loan requests.

5. The method of claim 1, wherein the plurality of user interface displays comprise hypertext markup language (HTML) documents, and communicating the user interface to the client system comprises transmitting the HTML documents via a network communication protocol in response to a request from the client system.

6. The method of claim 1, wherein storing the commercial loan application data in the storage device includes storing the data in a manner to be retrieved in response to customer identifying information.

7. The method of claim 1, wherein the customer is at least one of a plurality of borrowers and a plurality of companies.

8. A non-transitory machine-readable medium that includes a set of instructions, the set of instructions, which when executed, perform a method, comprising:
   communicating a user interface to a client system via a network communication link, the user interface comprising a first user interface display of a plurality of user interface displays configured to capture commercial loan application data, wherein
     the plurality of user interface displays are further configured to facilitate preparation of a commercial loan request for a customer, using the commercial loan application data;
   receiving one or more portions of the commercial loan application data from the client system via the network communication link as each portion of the one or more portions of commercial loan application data is captured by the first user interface display;
   storing the one or more portions of received commercial loan application data in a storage device;
   communicating at least a first portion of the received commercial loan application data to the client system, wherein
     the client system uses the first portion of the received commercial loan application data to pre-populate at least one data field of a second user interface display of the plurality of user interface displays;
   assigning the commercial loan request to a reviewer of a lending facility; and
   subsequent to approval of the commercial loan request by the lending facility, creating a financial account for the customer, and
     associating the lending facility with the financial account.

9. The non-transitory machine-readable medium of claim 8, wherein
- the plurality of user interface displays are further configured to capture lending facility syndication information, and
- the lending facility syndication information indicates the commercial loan request is split among several lending facilities.

10. The non-transitory machine-readable medium of claim 9, wherein the plurality of user interface displays are further configured to monitor a status of review corresponding to the commercial loan request.

11. The non-transitory machine-readable medium of claim 10, wherein the plurality of user interface displays are further configured to administer association of accounts with approved commercial loan requests.

12. The non-transitory machine-readable medium of claim 8, wherein the plurality of user interface displays comprise hypertext markup language (HTML) documents, and communicating the user interface to the client system comprises transmitting the HTML documents via a network communication protocol in response to a request from the client system.

13. The non-transitory machine-readable medium of claim 8, wherein storing the commercial loan application data in the storage device includes storing the data in a manner to be retrieved in response to customer identifying information.

14. A method, comprising:
- receiving a user interface at a computer system via a network communication link, the user interface comprising a first user interface display of a plurality of user interface displays configured to capture commercial loan application data, wherein
  - the plurality of user interface displays are further configured to facilitate preparation of a commercial loan request for a customer, using the commercial loan application data;
- receiving a user input, the user input comprising entry of one or more portions of the commercial loan application data, wherein the one or more portions of the commercial loan application is captured by the first user interface;
- communicating the one or more portions of commercial loan application data to a server to store in a storage device, wherein said communicating is performed as each portion of the one or more portions of commercial loan application data is captured;
- receiving at least a first portion of the captured commercial loan application data at the computer system from the server;
- pre-populating at least one data field of a second user interface display of the plurality of user interface displays using the received first portion of commercial loan application data,
  - wherein said pre-populating is performed by the computer system;
- displaying the pre-populated second user interface display on a display coupled to the computer system;
- assigning the commercial loan request to a reviewer of a lending facility; and
- subsequent to approval of the commercial loan request by the lending facility, creating a financial account for the customer, and
  - associating the lending facility with the financial account.

15. The method of claim 14, wherein
- the plurality of user interface displays are further configured to capture lending facility syndication information, and
- the lending facility syndication information indicates the commercial loan request is split among several lending facilities.

16. The method of claim 15, wherein the plurality of user interface displays are further configured to monitor a status of review corresponding to the commercial loan request.

17. The method of claim 15, wherein the plurality of user interface displays are further configured to
- assign an approval level corresponding to the commercial loan request, and
- assign each stage of an approval process to a specified reviewer.

18. The method of claim 16, wherein the plurality of user interface displays are further configured to administer association of accounts with approved commercial loan requests.

19. A non-transitory machine-readable medium that includes a set of instructions, the set of instructions, which when executed, perform a method, comprising:
- receiving a user interface at a computer system via a network communication link, the user interface comprising a first user interface display of a plurality of user interface displays configured to capture commercial loan application data, wherein
  - the plurality of user interface displays are further configured to facilitate preparation of a commercial loan request for a customer, using the commercial loan application data;
- receiving a user input, the user input comprising entry of one or more portions of the commercial loan application data, wherein the one or more portions of the commercial loan application is captured by the first user interface;
- communicating the one or more portions of commercial loan application data to a server to store in a storage device, wherein said communicating is performed as each portion of the one or more portions of commercial loan application data is captured;
- receiving at least a first portion of the captured commercial loan application data at the computer system from the server;
- pre-populating at least one data field of a second user interface display of the plurality of user interface displays using the received first portion of commercial loan application data,
  - wherein said pre-populating is performed by the computer system;
- displaying the pre-populated second user interface display on a display coupled to the computer system;
- assigning the commercial loan request to a reviewer of a lending facility; and
- subsequent to approval of the commercial loan request by the lending facility, creating a financial account for the customer, and
  - associating the lending facility with the financial account.

20. The non-transitory machine-readable medium of claim 19, wherein
- the plurality of user interface displays are further configured to capture lending facility syndication information, and
- the lending facility syndication information indicate the commercial loan request is split among several lending facilities.

21. The non-transitory machine-readable medium of claim 20, wherein the plurality of user interface displays are further configured to monitor a status of review corresponding to the commercial loan request.

22. The non-transitory machine-readable medium of claim 20, wherein the plurality of user interface displays are further configured to
   assign an approval level corresponding to the commercial loan request, and
   assign each stage of an approval process to a specified reviewer.

23. The non-transitory machine-readable medium of claim 21, wherein the plurality of user interface displays are further configured to administer association of accounts with approved commercial loan requests.

24. The non-transitory machine-readable medium of claim 19, wherein one of the plurality of user interface displays comprises a user interface display corresponding to a sequence of user interface displays accessible to the user via actuation of a tab associated with each display of the sequence of user interface displays.

* * * * *

UNITED STATES PATENT AND TRADEMARK OFFICE
CERTIFICATE OF CORRECTION

PATENT NO. : 8,160,955 B2
APPLICATION NO. : 10/024990
DATED : April 17, 2012
INVENTOR(S) : Wiryawan et al.

It is certified that error appears in the above-identified patent and that said Letters Patent is hereby corrected as shown below:

On page 2, in column 1, under U.S. Patent Documents, line 26, delete "Wirayawan" and insert -- Wiryawan --, therefor.

On page 2, in column 2, under "Other Publications", line 19, delete "2009;15" and insert -- 2009; 15 --, therefor.

In the Specifications:

In column 5, line 67, delete "user-actuateable" and insert -- user-actuatable --, therefor.

In column 10, line 19, delete "111" and insert -- UI --, therefor.

Signed and Sealed this
Seventeenth Day of July, 2012

David J. Kappos
*Director of the United States Patent and Trademark Office*